US007002917B1

(12) United States Patent
Saleh

(10) Patent No.: US 7,002,917 B1
(45) Date of Patent: Feb. 21, 2006

(54) METHOD FOR PATH SELECTION IN A NETWORK

(75) Inventor: Ali Najib Saleh, Ft. Lauderdale, FL (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/478,235

(22) Filed: Jan. 4, 2000

Related U.S. Application Data

(63) Continuation-in-part of application No. 09/232,397, filed on Jan. 15, 1999.

(51) Int. Cl.
*H04J 1/16* (2006.01)

(52) U.S. Cl. ..................................... 370/238; 709/238

(58) Field of Classification Search ............... 370/396, 370/397, 395.3, 395.31, 395.32, 400, 409, 370/406, 401, 412, 229–238, 218, 351, 252, 370/395.2; 711/221; 709/238–244
See application file for complete search history.

(56) References Cited

U.S. PATENT DOCUMENTS

| 5,049,871 | A | | 9/1991 | Sturgis et al. ............... 370/224 |
|---|---|---|---|---|
| 5,093,824 | A | | 3/1992 | Coan et al. .................... 370/16 |
| 5,412,376 | A | | 5/1995 | Chujo et al. .............. 340/825.1 |
| 5,590,118 | A | | 12/1996 | Nederlof ...................... 370/218 |
| 5,596,722 | A | * | 1/1997 | Rahnema .................... 709/241 |
| 5,646,936 | A | | 7/1997 | Shah et al. .................. 370/228 |
| 5,687,167 | A | * | 11/1997 | Bertin et al. ................ 370/254 |
| 5,737,319 | A | | 4/1998 | Croslin et al. .............. 370/255 |
| 5,754,543 | A | * | 5/1998 | Seid ............................ 370/351 |
| 5,781,528 | A | | 7/1998 | Sato et al. .................. 370/218 |
| 5,805,578 | A | | 9/1998 | Stirpe et al. ................ 370/255 |
| 5,805,593 | A | * | 9/1998 | Busche ....................... 370/396 |
| 5,835,696 | A | | 11/1998 | Hess ....................... 395/182.08 |
| 5,881,048 | A | | 3/1999 | Croslin ........................ 370/228 |
| 5,881,246 | A | | 3/1999 | Crawley et al. ............. 709/238 |

(Continued)

FOREIGN PATENT DOCUMENTS

EP 0 781 068 A1 6/1997

(Continued)

OTHER PUBLICATIONS

Hideki Sakauchi, et al., "A Self-Healing Network With An Economical Spare-Channel Assignment", Proceedings of the Globecom '90 IEEE Telecommunications Conference & Exhibition, vol. 1, 1991, pp. 438-443.

(Continued)

*Primary Examiner*—John Pezzlo
(74) *Attorney, Agent, or Firm*—Campbell Stephenson Ascolese LLP

(57) ABSTRACT

A method for finding a path in a network is disclosed. The network includes a plurality of nodes and a plurality of links and each one of the plurality of nodes is coupled to at least one other of the plurality of nodes by at least one of the plurality of links. Such a method generates at least one path cost data set and accessing the path cost data set to provide the requisite path information. The path cost data set represents a path cost between a root node of the nodes and destination node of the nodes. The path begins at the root node and ends at the destination node. The generation and accessing operations are performed in such a manner that a minimum-hop path and a minimum-cost path can be determined from the at least one path cost data set. The minimum-hop path represents a path between the root node and the destination node having a minimum number of hops. The minimum-cost path represents a path between the root node and the destination node having a minimum cost.

67 Claims, 18 Drawing Sheets

U.S. PATENT DOCUMENTS

| | | | | |
|---|---|---|---|---|
| 5,884,297 A * | 3/1999 | Noven | 370/395.3 |
| 5,920,257 A | 7/1999 | Commerford | 340/506 |
| 5,933,425 A | 8/1999 | Iwata | 370/351 |
| 5,959,972 A | 9/1999 | Hamami | 370/228 |
| 5,987,526 A | 11/1999 | Morales | 709/249 |
| 5,995,503 A | 11/1999 | Crawley et al. | 370/351 |
| 5,999,286 A | 12/1999 | Venkatesan | 359/117 |
| 6,011,780 A | 1/2000 | Vaman et al. | 370/237 |
| 6,041,037 A | 3/2000 | Nishio et al. | 370/228 |
| 6,041,049 A * | 3/2000 | Brady | 370/351 |
| 6,047,331 A | 4/2000 | Medard et al. | 709/239 |
| 6,075,766 A | 6/2000 | Croslin | 370/225 |
| 6,075,775 A | 6/2000 | Ueki | 370/248 |
| 6,097,696 A | 8/2000 | Doverspike | 370/216 |
| 6,097,722 A | 8/2000 | Graham et al. | 370/395 |
| 6,115,753 A | 9/2000 | Joens | 709/242 |
| 6,130,876 A | 10/2000 | Chaudhuri | 370/228 |
| 6,130,881 A * | 10/2000 | Stiller et al. | 370/238 |
| 6,134,671 A | 10/2000 | Commerford et al. | 714/4 |
| 6,148,000 A | 11/2000 | Feldman et al. | 370/397 |
| 6,154,778 A | 11/2000 | Koistinen et al. | 709/228 |
| 6,222,653 B1 | 4/2001 | Asahi | 359/110 |
| 6,259,673 B1 | 7/2001 | Yoshihara et al. | 370/238 |
| 6,272,107 B1 | 8/2001 | Rochberger et al. | 370/216 |
| 6,275,492 B1 | 8/2001 | Zhang | 370/392 |
| 6,282,170 B1 | 8/2001 | Bentall et al. | 370/225 |
| 6,292,464 B1 | 9/2001 | Elahmadi et al. | 370/223 |
| 6,301,244 B1 | 10/2001 | Huang et al. | 370/351 |
| 6,304,549 B1 | 10/2001 | Srinivasan et al. | 370/230 |
| 6,324,162 B1 | 11/2001 | Chaudhuri | 370/225 |
| 6,347,078 B1 | 2/2002 | Narvaez-Guarnieri et al. | 370/230 |
| 6,370,119 B1 * | 4/2002 | Basso et al. | 370/252 |
| 6,400,681 B1 * | 6/2002 | Bertin et al. | 370/218 |
| 6,430,150 B1 | 8/2002 | Azuma et al. | 370/218 |
| 6,457,050 B1 | 9/2002 | Cowan et al. | 709/224 |
| 6,463,062 B1 | 10/2002 | Buyukkoc et al. | 370/395.1 |
| 6,504,845 B1 * | 1/2003 | Petersen et al. | 370/412 |
| 6,633,544 B1 * | 10/2003 | Rexford et al. | 370/238 |

FOREIGN PATENT DOCUMENTS

EP    0 841 824 A2    5/1998

OTHER PUBLICATIONS

Baruch Awerbuch, et al., "Distributed Controls For PARIS", Proc. Annual ACM Symp. On Principles Of Distributed Computing, Aug. 22, 1999, pp. 145-159.

Sujai Hajela, "HP OEMF: Alarm Management In Telecommunications Networks", *Hewlett Packard Journal*, Oct., 1996, vol. 47, No. 5, pp. 22-30.

Ali Saleh; H. Michael Zadikian; Zareh Baghdasarian, Vahid Parsi, "A Method For Routing Information Over A Network", filed Jan. 15, 1999; U.S. Appl. No. 09/232,397.

H. Michael Zadikian; Steven E. Plote, John C. Adler, David Parish Autry, Ali Saleh, "Method of Providing Network Services", filed Jan. 4, 2000; U.S. Appl. No. 09/477,498.

Ali N. Saleh and Steven E. Plote, "A Network Addressing Scheme For Reducing Protocol Overhead In An Optical Network", filed Sep. 2, 1999; U.S. Appl. No. 09/389,302.

Ali Saleh, H. Michael Zadikian; John C. Adler, Zareh Baghdasarian, Vahid Parsi, "Configurable Network Router", filed Jan. 15, 1999; U.S. Appl. 09/232,395.

Ali N. Saleh, Douglas E. Duschatko, Lane Byron Quibodeaux, "Method And Apparatus For A Rearrangeably Non-Blocking Switching Matrix", filed Jan. 4, 2000; U.S. Appl. No. 09/477,166.

H. Michael Zadikian, Ali Saleh; John C. Adler, Zareh Baghdasarian, Vahid Parsi, "A Resource Management Protocol For A Configurable Network Router", filed Jan. 4, 2000; U.S. Appl. No. 60/174,323.

Ronald Alan Russell and Michael Kevin Anthony, "A Method And Apparatus For Isolating Faults In A Switching Matrix", filed Jan. 4, 2000; U.S. Appl. No. 09/477,217.

H. Michael Zadikian, Ali Saleh, John C. Adler, Zareh Baghdasarian, Vahid Parsi, "A Method of Allocating Bandwidth in an Optical Network" (as amended), filed Jan. 15, 1999, U.S. Appl. No. 09/232,396.

The ATM Forum Technical Committee, "Interim Interswitch Signaling Protocol (IISP) Specification v1.0", af-pnni-0026.000, Dec. 1994, pp. 1-34.

The ATM Forum Technical Committee, Private Network-Network Interface Specification Version 1.0 (PNNI 1.0), afpnni-0055.000, Mar. 1996, pp. v-xviii, pp. 19, 1-366.

The ATM Forum Technical Committee, Private Network-Network Interface Specification Version 1.0 Addendum (Soft PVC MIB), af-pnni-0066.000, Sep. 1996.

The ATM Forum Technical Committee, Addendum to PNNI V1.0 for ABR parameter negotiation, af-pnni-0075.000, Jan. 1997.pp. 2-3.

The ATM Forum Technical Committee, PNNI V1.0 Errata and PICS, af-pnni-0081.000, May 1997, pp. 2-224.

J. Moy, "OSPF Version 2", Ascend Communications, Inc., Apr. 1998.

K. Murakami, et al., "A MAPOS version 1 Extension—Switch-Switch Protocol", NTT Laboratories, Jun. 1997.

F. Baker, et al., "OSPF Version 2 Management Information Base", Cisco Systems, Nov. 1995.

F. Baker, et al., "PPP Bridging Control Protocol (BCP)", IBM, Jun. 1994.

E. Decker, "Definitions of Managed Objects for Bridges", Cisco Systems, Inc., Jul. 1993.

* cited by examiner

METHOD FOR PATH SELECTION IN A NETWORK

CROSS-REFERENCES TO RELATED APPLICATIONS

This application is a continuation-in-part of patent application Ser. No. 09/232,397, filed Jan. 15, 1999 now U.S. Pat. No. 6,856,627 and entitled "A METHOD FOR ROUTING INFORMATION OVER A NETWORK," having A. N. Saleh, H. M. Zadikian, Z. Baghdasarian, and V. Parsi as inventors. This application is hereby incorporated by reference, in its entirety and for all purposes.

This application is related to patent application Ser. No. 09/232,395, filed Jan. 15, 1999, now U.S. Pat. No. 6,724,757 and entitled "A CONFIGURABLE NETWORK ROUTER," having H. M. Zadikian, A. N. Saleh, J. C. Adler, Z. Baghdasarian, and V. Parsi as inventors; patent application Ser. No. 09/232,396, filed Jan. 15, 1999 now U.S. Pat. No. 6,631,134 and entitled "METHOD OF ALLOCATING BANDWIDTH IN AN OPTICAL NETWORK," having H. M. Zadikian, A. Saleh, J. C. Adler, Z. Baghdasarian, and V. Parsi as inventors; Patent Application No. 60/174,323, filed Jan. 4, 2000, filed herewith, and entitled "A RESOURCE MANAGEMENT PROTOCOL FOR A CONFIGURABLE NETWORK ROUTER" having H. M. Zadikian, A. Saleh, J. C. Adler, Z. Baghdasarian and Vahid Parsi as inventors; patent application Ser. No. 09/477,166, filed Jan. 4, 2000, filed herewith, and entitled "METHOD AND APPARATUS FOR A REARRANGEABLY NON-BLOCKING SWITCHING MATRIX," having Ali Najib Saleh, Douglas Duschatko, Lane Byron Quihodeaux as inventors; patent application Ser. No. 09/477,217, filed Jan. 4, 2000, now U.S. Pat. No. 6,856,600, filed herewith, and entitled "FAULT ISOLATION IN A SWITCHING MATRIX," having R. A. Russell and M. K. Anthony as inventors; patent application Ser. No. 09/389,302, filed Sep. 2, 1999, now U.S. Pat. No. 6,801,496, and entitled "NETWORK ADDRESSING SCHEME FOR REDUCING PROTOCOL OVERHEAD IN AN OPTICAL NETWORK," having A. Saleh and S. E. Plote as inventors; patent application Ser. No. 09/477,498, filed Jan. 4, 2000, filed herewith, and entitled "METHOD OF PROVIDING NETWORK SERVICES," having H. M. Zadikian, S. E. Plote, J. C. Adler, D. P. Autry, and A. Saleh as inventors. These related applications are hereby incorporated by reference, in their entirety and for all purposes.

BACKGROUND OF THE INVENTION

1. Field of the Invention

This invention relates to the field of information networks, and more particularly relates to a method for discovering preferable routes between two nodes in a network.

2. Description of the Related Art

Today's networks carry vast amounts of information. High bandwidth applications supported by these networks include streaming video, streaming audio, and large aggregations of voice traffic. In the future, these demands are certain to increase. To meet such demands, an increasingly popular alternative is the use of lightwave communications carried over fiber optic cables. The use of lightwave communications provides several benefits, including high bandwidth, ease of installation and capacity for future growth.

The synchronous optical network (SONET) protocol is among those protocols designed to employ an optical infrastructure and is widely employed in voice and data communications networks. SONET is a physical transmission vehicle capable of transmission speeds in the multi-gigabit range, and is defined by a set of electrical as well as optical standards. SONET networks have traditionally been protected from failures by using topologies that support fast restoration in the event of network failures. Their fast restoration time makes most failures transparent to the end-user, which is important in applications such as telephony and other voice communications. Existing schemes rely on techniques such as 1-plus-1 and 1-for-1 topologies that carry active traffic over two separate fibers (line switched) or signals (path switched), and use a protocol (Automatic Protection Switching or APS), or hardware (diverse protection) to detect, propagate and restore failures.

In routing the large amounts of information between the nodes of an optical network, a fast, efficient method for finding the most preferable path through that network is desirable. For example, in the case of voice communications, the failure of a link or node can disrupt a large number of voice circuits. The detection of such faults and the restoration of information flow must often occur very quickly to avoid noticeable interruption of such services. For most telephony implementations, for example, failures must be detected within about 10 ms and restoration must occur within about 50 ms. The short restoration time is critical in supporting applications, such as current telephone networks, that are sensitive to quality of service (QoS) because such detection and restoration times prevent old digital terminals and switches from generating alarms (e.g., initiating Carrier Group Alarms (CGAs)). Such alarms are undesirable because they usually result in dropped calls, causing users down time and aggravation. Restoration times exceeding 10 seconds can lead to timeouts at higher protocol layers, while those that exceed 1 minute can lead to disastrous results for the entire network.

In a SONET network, a failure of a given link results in a loss of signal (LOS) condition at the nodes connected by that link (per Bellcore's recommendations in GR-253 (GR-253: *Synchronous Optical Network (SONET) Transport Systems*, Common Generic Criteria, Issue 2 [Bellcore, December 1995], included herein by reference, in its entirety and for all purposes)). The LOS condition propagated an Alarm Indication Signal (AIS) downstream, and Remote Defect Indication (RDI) upstream (if the path still exists), and an LOS defect locally. The defect is upgraded to a failure 2.5 seconds later, which causes an alarm to be sent to the Operations System (OS) (per GR-253). When using SONET, the handling of the LOS condition should follow Bellcore's recommendations in GR-253 (e.g., 3 ms following a failure, an LOS defect is detected and restoration should be initiated). This allows nodes to inter-operate, and co-exist, with other network equipment (NE) in the same network. The arrival of the AIS at a node causes the node to send a similar alarm to its neighbor and for that node to send an AIS to its own neighbor, and so on. Under GR-253, each node is allowed a maximum time in which to forward the AIS in order to quickly propagate the indication of a failure.

Thus, the ability to quickly restore network connections is an important requirement in today's networks, especially with regard to providing end-users with acceptable service (e.g., providing telecommunications subscribers with uninterrupted connections). In turn, a method for finding an alternate route with sufficient quality-of-service characteristics in the event of a network failure that is fast and efficient must be provided to enable such quick restoration.

SUMMARY OF THE INVENTION

The present invention improves the speed and efficiency with which a failed circuit is restored (or a new circuit is provisioned) in a network by allowing the identification of one or more desirable paths through a network, based on criteria such as the number of hops between two nodes, physical distance between two nodes, bandwidth requirements, other quality of service metrics, and the like. A quality-of serviced-based shortest path first (QSPF) method according to the present invention selects a path by analyzing a database containing information regarding the links within the network being analyzed. The database may be pre-processed by pruning links that, for one reason or another, fail to meet the requirements of the path being routed as an initial matter. This requirement might be, for example, bandwidth, with all links having insufficient bandwidth. This might be additionally limited to bandwidth for a given class of service. The method then successively determines the most desirable path to certain nodes in the network, re-calculating the path as nodes increasingly farther from the node calculating the path (the root node) are considered, filling the entries in a path table as the method proceeds. This process continues until an end condition is reached, such as when all nodes in the network are processed, the second of the two end nodes (the destination node) is reached, a maximum number of hops has been reached, or some other criteria is met. The method then back-tracks from the destination node to the root node in order to read the path from the path table. As will be apparent to one of skill in the art, this method may be modified in a number of ways and still achieve the same ends in a similar manner.

In one embodiment of the present invention, a method for finding a path in a network is disclosed. The network includes a plurality of nodes and a plurality of links and each one of the plurality of nodes is coupled to at least one other of the plurality of nodes by at least one of the plurality of links. Such a method generates at least one path cost data set and accessing the path cost data set to provide the requisite path information. The path cost data set represents a path cost between a root node of the nodes and destination node of the nodes. The path begins at the root node and ends at the destination node. The generation and accessing operations are performed in such a manner that a minimum-hop path and a minimum-cost path can be determined from the at least one path cost data set. The minimum-hop path represents a path between the root node and the destination node having a minimum number of hops. The minimum-cost path represents a path between the root node and the destination node having a minimum cost.

In one aspect of this embodiment, the path cost data set is stored in a path storage area such that the at least one path cost data set can be accessed to determine the minimum-hop path and the minimum-cost path. In this aspect, the path storage area may be allocated in a data structure that facilitates the access to determine the minimum-hop path and the minimum-cost path.

In another aspect of this embodiment, the at least one path cost data set is stored in a data structure that is a two-dimensional array of entries arranged in a plurality of rows and a plurality of columns. In this aspect, each one of the rows in the data structure corresponds to one of the plurality of nodes, and each one of the columns in the data structure corresponds to a given hop count.

This aspect may be extended in at least two ways. First, the minimum-hop path to the destination node may be determined. This may be accomplished by performing the following actions, for example. One of the rows corresponding to the destination node can be traversed from a first column of the columns to a second column of the columns. Path information representing the minimum-hop path may then be stored while traversing the data structure from the second column to the first column. In this aspect, the second column is a first one of the columns encountered when traversing the row from the first column to the second column having non-default cost entry. The first column can correspond, for example, to the root node.

This aspect may also be extended to determine the minimum-cost path to the destination node. This may be accomplished by performing the following actions, for example. A minimum-cost column of the columns can be identified, where the minimum-cost column has a lowest cost entry of all of the columns in a one of the rows corresponding to the destination node. Path information representing the minimum-cost path can then be stored while traversing the data structure from the minimum-cost column to a first column of the columns. The first column can correspond, for example, to the root node.

The foregoing is a summary and thus contains, by necessity, simplifications, generalizations and omissions of detail; consequently, those of ordinary skill in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those of ordinary skill in the art by referencing the accompanying drawings.

The use of the same reference symbols in different drawings indicates similar or identical items.

DETAILED DESCRIPTION

Figure 1:
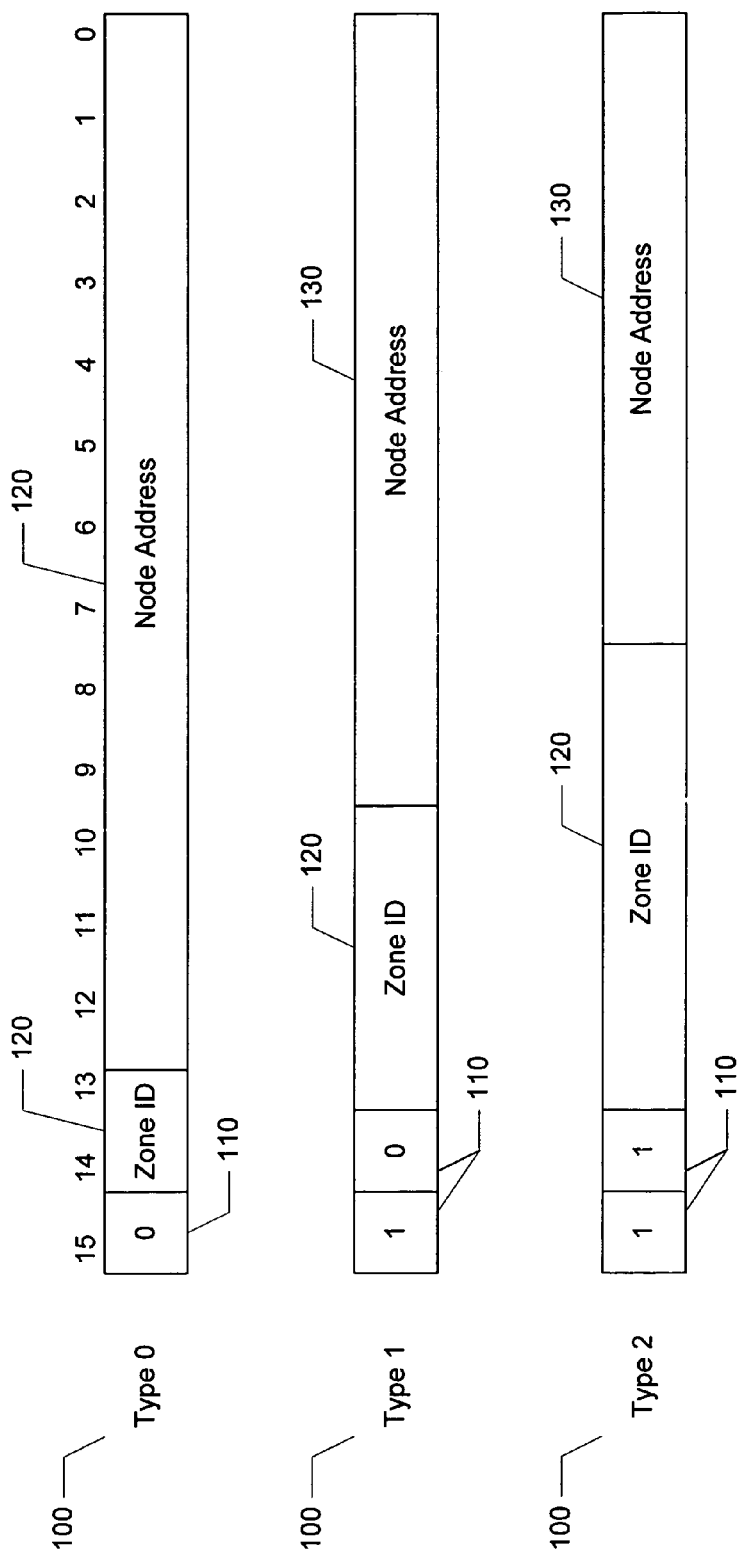
FIG. 1 illustrates the layout of a Node Identifier (Node ID).

The following is intended to provide a detailed description of an example of the invention and should not be taken to be limiting of the invention itself. Rather, any number of variations may fall within the scope of the invention which is defined in the claims following the description.

In one embodiment, a method of finding a preferable path through a network is provided, which is capable, for example, of supporting a routing protocol capable of providing restoration times on the order of about 50 ms or less using a physical network layer for communications between network nodes (e.g., SONET). This is achieved by using a priority (or quality-of-service (QoS)) metric for connections (referred to herein as virtual paths or VPs) and links. The QoS parameter, which may include parameters such as bandwidth, physical distance, availability, and the like, makes possible the further reduction of protection bandwidth, while maintaining the same quality of service for those connections that need and, more importantly, can afford such treatment. Thus, availability can be mapped into a cost metric and only made available to users who can justify the cost of a given level of service.

Network Architecture

To limit the size of the topology database maintained by each node and the scope of broadcast packets distributed in a network employing a method according to the present invention, such a network can be divided into smaller logical groups called "zones." Each zone runs a separate copy of the topology distribution algorithm, and nodes within each zone are only required to maintain information about their own zone. There is no need for a zone's topology to be known outside its boundaries, and nodes within a zone need not be aware of the network's topology external to their respective zones.

Nodes that attach to multiple zones are referred to herein as border nodes. Border nodes are required to maintain a separate topological database, also called a link-state or connectivity database, for each of the zones they attach to. Border nodes use the connectivity database(s) for intra-zone routing. Border nodes are also required to maintain a separate database that describes the connectivity of the zones themselves. This database, which is called the network database, is used for inter-zone routing. The database describes the topology of a special zone, referred to herein as the backbone, which is normally assigned an ID of 0. The backbone has all the characteristics of a zone. There is no need for a backbone's topology to be known outside the backbone, and its border nodes need not be aware of the topologies of other zones.

A network is referred to herein as flat if the network consists of a single zone (i.e., zone 0 or the backbone zone). Conversely, a network is referred to herein as hierarchical if the network contains two or more zones, not including the backbone. The resulting multi-level hierarchy (i.e., nodes and one or more zones) provides the following benefits:

1. The size of the link state database maintained by each network node is reduced, which allows the protocol to scale well for large networks.
2. The scope of broadcast packets is limited, reducing their impact.
   Broadcast packets impact bandwidth by spawning offspring exponentially—the smaller scope results in a fewer number of hops and, therefore, less traffic.
   The shorter average distance between nodes also results in a much faster restoration time, especially in large networks (which are more effectively divided into zones).
3. Different sections of a long route (i.e., one spanning multiple zones) can be computed separately and in parallel, speeding the calculations.
4. Restricting routing to be within a zone prevents database corruption in one zone from affecting the intra-zone routing capability of other zones because routing within a zone is based solely on information maintained within the zone.

As noted, the protocol routes information at two different levels: inter-zone and intra-zone. The former is only used when the source and destination nodes of a virtual path are located in different zones. Inter-zone routing supports path restoration on an end-to-end basis from the source of the virtual path to the destination by isolating failures between zones. In the latter case, the border nodes in each transit zone originate and terminate the path-restoration request on behalf of the virtual path's source and destination nodes. A border node that assumes the role of a source (or destination) node during the path restoration activity is referred to herein as a proxy source (destination) node. Such nodes are responsible for originating (terminating) the RPR request with their own zones. Proxy nodes are also required to communicate with border nodes in other zones to establish an inter-zone path for the VP.

In one embodiment, every node in a network employing the protocol is assigned a globally unique 16-bit ID referred to herein as the node ID. A node ID is divided into two parts, zone ID and node address. Logically, each node ID is a pair (zone ID, node address), where the zone ID identifies a zone within the network, and the node address identifies a node within that zone. To minimize overhead, the protocol defines three types of node IDs, each with a different size zone ID field, although a different number of zone types can be employed. The network provider selects which packet type to use based on the desired network architecture.

FIG. 1 illustrates the layout of a node ID 100 using three types of node IDs. As shown in FIG. 1, a field referred to herein as type ID 110 is allocated either one or two bits, a zone ID 120 of between 2–6 bits in length, and a node address 130 of between about 8–13 bits in length. Type 0 IDs allocate 2 bits to zone ID and 13 bits to node address, which allows up to $2^{13}$ or 8192 nodes per zone. As shown in FIG. 1, type 1 IDs devote 4 bits to zone ID and 10 bits to node address, which allows up to $2^{10}$ (i.e. 1024) nodes to be placed in each zone. Finally, type 2 IDs use a 6-bit zone ID and an 8-bit node address, as shown in FIG. 1. This allows up to 256 nodes to be addressed within the zone. It will be obvious to one of ordinary skill in the art that the node ID bits can be apportioned in several other ways to provide more levels of addressing.

Type 0 IDs work well for networks that contain a small number of large zones (e.g., less than about 4 zones). Type 2 IDs are well suited for networks that contain a large number of small zones (e.g., more than about 15). Type 1 IDs provide a good compromise between zone size and number of available zones, which makes a type 1 node ID a good choice for networks that contain an average number of medium size zones (e.g., between about 4 and about 15). When zones being described herein are in a network, the node IDs of the nodes in a zone may be delineated as two decimal numbers separated by a period (e.g., ZoneID.NodeAddress).

Figure 2:
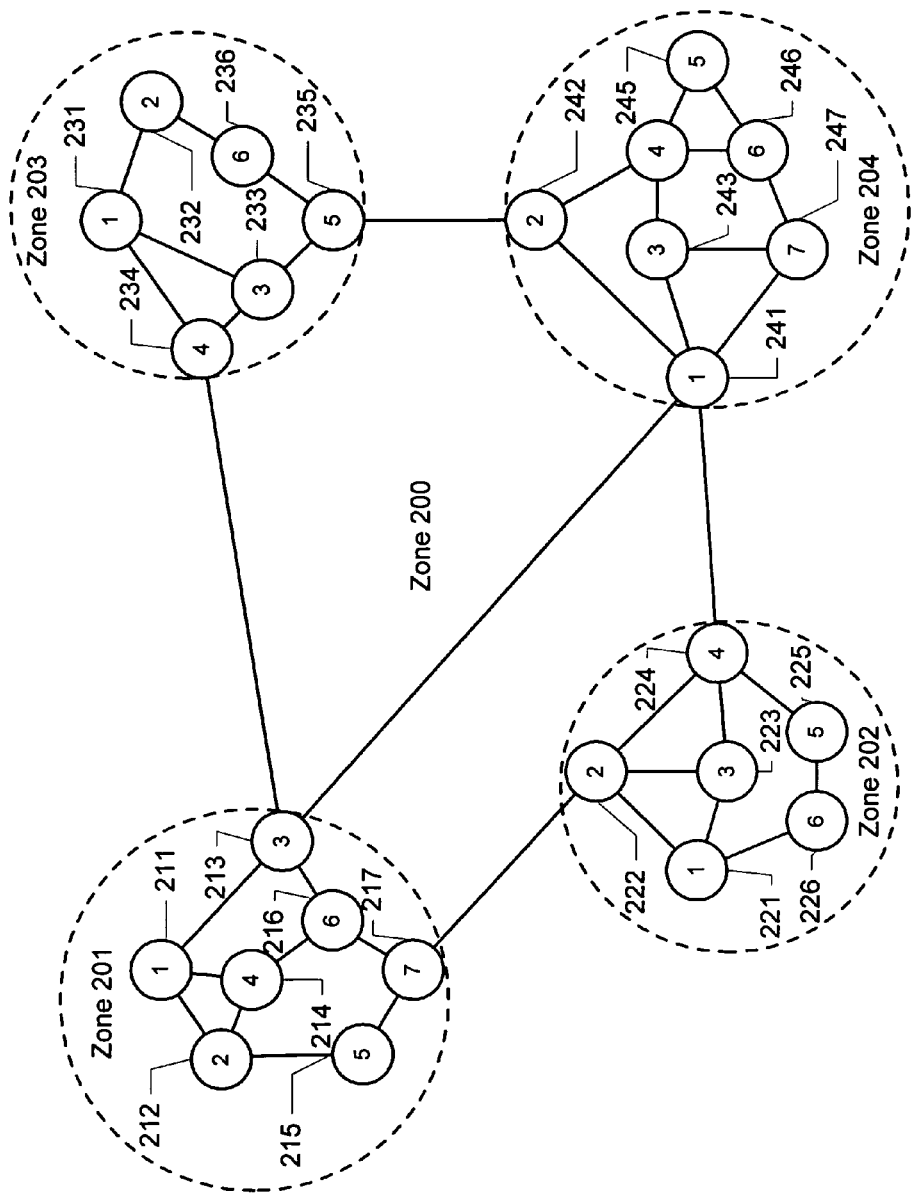
FIG. 2 is a block diagram of a zoned network consisting of four zones and a backbone.

FIG. 2 illustrates an exemplary network that has been organized into a backbone, zone 200, and four configured zones, zones 201–204, which are numbered 0–4 under the protocol, respectively. The exemplary network employs a type 0 node ID, as there are relatively few zones (4). The solid circles in each zone represent network nodes, while the numbers within the circles represent node addresses, and include network nodes 211–217, 221–226, 231–236, and 241–247. The dashed circles represent network zones. The network depicted in FIG. 2 has four configured zones (zones 1–4) and one backbone (zone 0). Nodes with node IDs 1.3, 1.7, 2.2, 2, 4, 3.4, 3.5, 4.1, and 4.2 (network nodes 213, 217, 222, 224, 234, 235, 241, and 242, respectively) are border nodes because they connect to more than one zone. All other nodes are interior nodes because their links attach only to nodes within the same zone. Backbone 200 consists of 4 nodes, zones 201–204, with node IDs of 0.1, 0.2, 0.3, and 0.4, respectively.

Once a network topology has been defined, the protocol allows the user to configure one or more end-to-end connections that can span multiple nodes and zones. This operation is referred to herein as provisioning. Each set of physical connections that are provisioned creates an end-to-end connection between the two end nodes that supports a virtual point-to-point link (referred to herein as a virtual path or VP). The resulting VP has an associated capacity and an operational state, among other attributes. The end points of a VP can be configured to have a master/slave relationship. The terms source and destination are also used herein in referring to the two end-nodes. In such a relationship, the node with a numerically lower node ID assumes the role of the master (or source) node, while the other assumes the role of the slave (or destination) node. The protocol defines a convention in which the source node assumes all recovery responsibilities and that the destination node simply waits for a message from the source node informing the destination node of the VP's new path, although the opposite convention could easily be employed.

VPs are also assigned a priority level, which determines their relative priority within the network. This quality of service (QoS) parameter is used during failure recovery procedures to determine which VPs are first to be restored. Four QoS levels (0–3) are nominally defined in the protocol, with 0 being the lowest, although a larger or smaller number of QoS levels can be used. Provisioning is discussed in greater detail subsequently herein.

Initialization of Network Nodes

In one embodiment, network nodes use a protocol such as that referred to herein as the Hello Protocol in order to establish and maintain neighbor relationships, and to learn and distribute link-state information throughout the network. The protocol relies on the periodic exchange of bi-directional packets (Hello packets) between neighbors. During the adjacency establishment phase of the protocol, which involves the exchange of INIT packets, nodes learn information about their neighbors, such as that listed in Table 1.

TABLE 1

Information regarding neighbors stored by a node.

| Parameter | Usage |
| --- | --- |
| Node ID | Node ID of the sending node, which is preferably, from 8 bits to 32 bits. |
| HelloInterval | How often Hello packets should be sent by the receiving node |
| HelloDeadInterval | The time interval, in seconds, after which the sending node will consider its neighbor dead if a valid Hello packets is not received. |
| LinkCost | Cost of the link between the two neighbors. This may represent distance, delay or any other metric. |
| LinkCapacity | Total link capacity |
| QoS3Capacity | Link capacity reserved for QoS 3 connections |
| QoSnCapacity | Link capacity reserved for QoS 0–2 connections |

During normal protocol operation, each node constructs a structure known as a Link State Advertisement (LSA), which contains a list of the node's neighbors, links, the capacity of those links, the quality of service available on over links, one or more costs associated with each of the links, and other pertinent information. The node that constructs the LSA is called the originating node. Normally, the originating node is the only node allowed to modify its contents (except for the HOP_COUNT field, which is not included in the checksum and so may be modified by other nodes). The originating node retransmits the LSA when the LSA's contents change. The LSA is sent in a special Hello packet that contains not only the node's own LSA in its advertisement, but also ones received from other nodes. The structure, field definitions, and related information are illustrated subsequently in FIG. 18 and described in the corresponding discussion. Each node stores the most recently generated instance of an LSA in its database. The list of stored LSAs gives the node a complete topological map of the network. The topology database maintained by a given node is, therefore, nothing more than a list of the most recent LSAs generated by its peers and received in Hello packets.

In the case of a stable network, the majority of transmitted Hello packets are empty (i.e., contain no topology information) because only altered LSAs are included in the Hello messages. Packets containing no changes (no LSAs) are referred to herein as null Hello packets. The Hello protocol requires neighbors to exchange null Hello packets periodically. The HelloInterval parameter defines the duration of this period. Such packets ensure that the two neighbors are alive, and that the link that connects them is operational.

Initialization Message

An INIT message is the first protocol transaction conducted between adjacent nodes, and is performed upon network startup or when a node is added to a pre-existing network. An INIT message is used by adjacent nodes to initialize and exchange adjacency parameters. The packet contains parameters that identify the neighbor (the node ID of the sending node), its link bandwidth (both total and available, on a QoS3/QoSn basis), and its configured Hello protocol parameters. The structure, field definitions, and related information are illustrated subsequently in FIG. 17 and described in the text corresponding thereto.

In systems that provide two or more QoS levels, varying amounts of link bandwidth may be set aside for the exclusive use of services requiring a given QoS. For example, a certain amount of link bandwidth may be reserved for QoS3 connections. This guarantees that a given amount of link bandwidth will be available for use by these high-priority services. The remaining link bandwidth would then be available for use by all QoS levels (0–3). The Hello parameters include the HelloInterval and HelloDeadInterval parameters. The HelloInterval is the number of seconds between transmissions of Hello packets. A zero in this field indicates that this parameter hasn't been configured on the sending node and that the neighbor should use its own configured interval. If both nodes send a zero in this field then a default value (e.g., 5 seconds) should be used. The HelloDeadInterval is the number of seconds the sending node will wait before declaring a silent neighbor down. A zero in this field indicates that this parameter hasn't been configured on the sending node and that the neighbor should use its own configured value. If both nodes send a zero in this field then a default value (e.g., 30 seconds) should be used. The successful receipt and processing of an INIT packet causes a START event to be sent to the Hello State machine, as is described subsequently.

Hello Message

Once adjacency between two neighbors has been established, the nodes periodically exchange Hello packets. The interval between these transmissions is a configurable parameter that can be different for each link, and for each direction. Nodes are expected to use the HelloInterval parameters specified in their neighbor's Hello message. A neighbor is considered dead if no Hello message is received from the neighbor within the HelloDeadInterval period (also a configurable parameter that can be link-blank and direction-specific).

In one embodiment, nodes in a network continuously receive Hello messages on each of their links and save the most recent LSAs from each message. Each LSA contains, among other things, an LSID (indicating which instance of the given LSA has been received) and a HOP_COUNT. The HOP_COUNT specifies the distance, as a number of hops, between the originating node and the receiving node. The originating node always sets this field of 0 when the LSA is created. The HOP_COUNT field is incremented by one for each hop (from node to node) traversed by the LSA instance. The HOP_COUNT field is set to zero by the originating node and is incremented by one on every hop of the flooding procedure. The ID field is initialized to FIRST_LSID during node start-up and is incremented every time a new instance of the LSA is created by the originating node. The initial ID is only used once by each originating node. Preferably, an LSA carrying such an ID is always accepted as most recent. This approach allows old instances of an LSA to be quickly flushed from the network when the originating node is restarted.

During normal network operation, the originating node of an LSA transmits LS update messages when the node detects activity that results in a change in its LSA. The node sets the HOP_COUNT field of the LSA to 0 and the LSID field to the LSID of the previous instance plus 1. Wraparound may be avoided by using a sufficiently-large LSID (e.g., 32 bits). When another node receives the update message, the LSA is recorded in the node's database and schedules the LSA for transmission to its own neighbors. The HOP_COUNT field is incremented by one and transmitted to the neighboring nodes. Likewise, when the nodes downstream of the current node receive an update message with a HOP_COUNT of H, they transmit their own update message to all of their neighbors with a HOP_COUNT of H+1, which represents the distance (in hops) to the originating node. This continues until the update message either reaches a node that has a newer instance of the LSA in its database or the hop-count field reaches MAX_HOPS.

Figure 3:
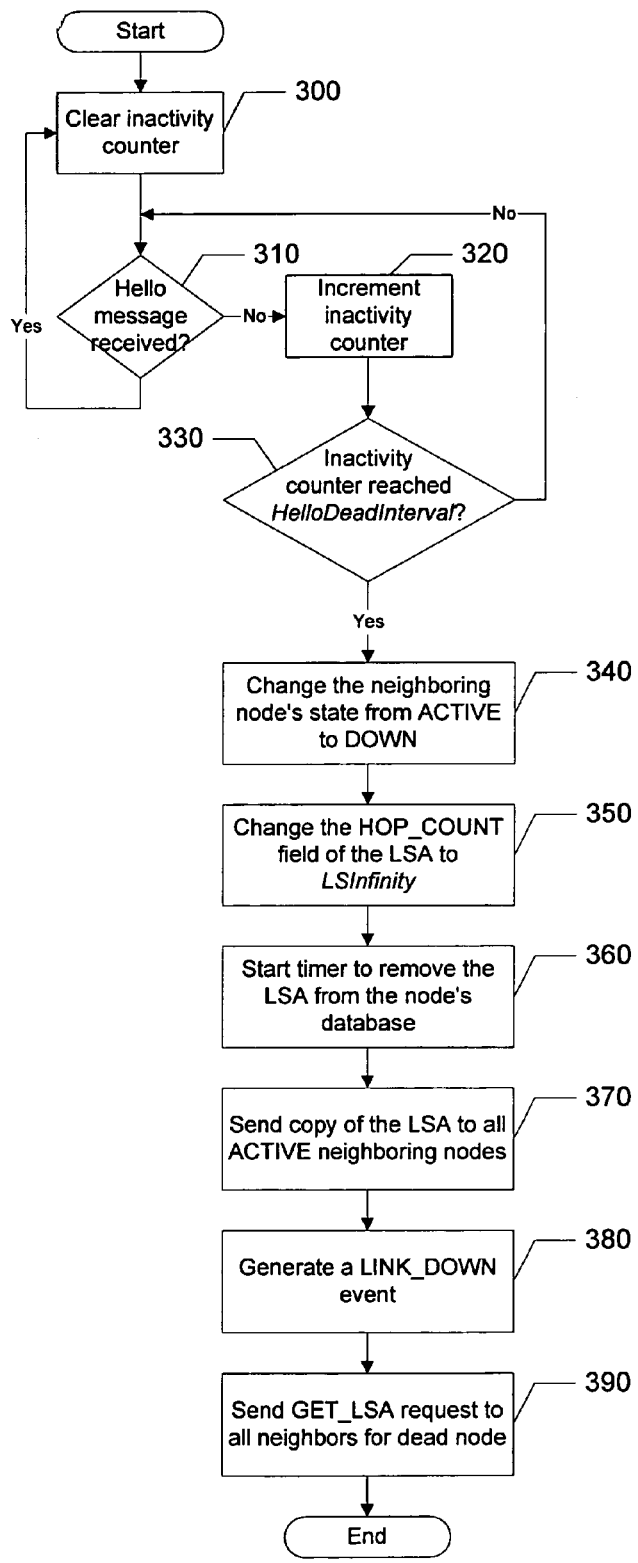
FIG. 3 is a flow diagram illustrating the actions performed by a neighboring node in the event of a failure.

FIG. 3 is a flow diagram illustrating the actions performed in the event of a failure. When the connection is created, the inactivity counter associated with the neighboring node is cleared (step 300). When a node receives a Hello message (null or otherwise) from a neighboring node (step 310), the receiving node clears the inactivity counter (step 300). If the neighboring node fails, or any component along the path between the node and the neighboring node fails, the receiving node stops receiving update messages from the neighboring node. This causes the inactivity counter to increase gradually (step 320) until reaching HelloDeadInterval (step 330). Once HelloDeadInterval is reached, several actions are taken. First, the node changes the state of the neighboring node from ACTIVE to DOWN (step 340). Next, the HOP_COUNT field of the LSA is set to LSInfinity (step 350). A timer is then started to remove the LSA from the node's link state database within LSZombieTime (step 360). A copy of the LSA is then sent to all active neighbors (step 370). Next, a LINK_DOWN event is generated to cause all VP's that use the link between the node and its neighbor to be restored (step 380). Finally, a GET_LSA request is sent to all neighbors, requesting their copy of all LSA's previously received from the now-dead neighbor (step 390).

It should be noted that those of ordinary skill in the art will recognize the boundaries between and order of operations in this and the other flow diagrams described herein are merely illustrative and alternative embodiments may merge operations, impose an alternative decomposition of functionality of operations, or re-order the operations presented therein. For example, the operations discussed herein may be decomposed into sub-operations to be executed as multiple computer processes. Moreover, alternative embodiments may combine multiple instances of particular operation or sub-operations. Furthermore, those of ordinary skill in the art will recognize that the operations described in this exemplary embodiment are for illustration only. Operations may be combined or the functionality of the operations may be distributed in additional operations in accordance with the invention.

Figure 4:
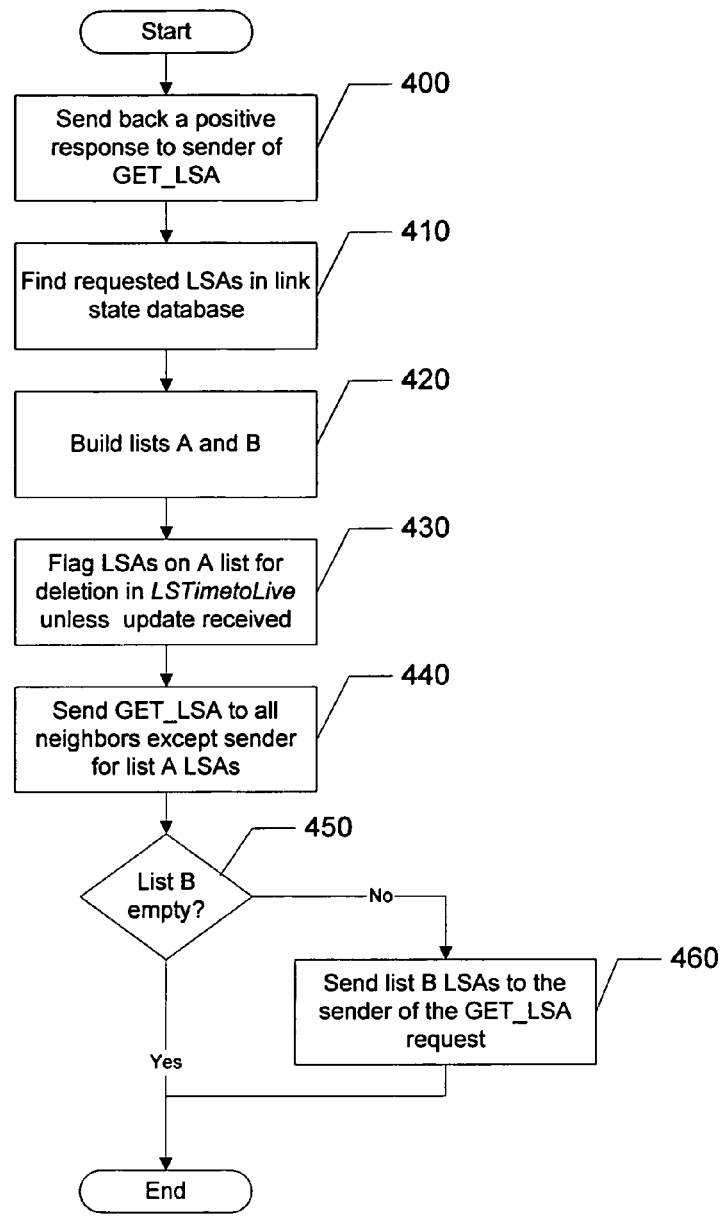
FIG. 4 is a flow diagram illustrating the actions performed by a downstream node in the event of a failure.

FIG. 4 is a flow diagram illustrating the actions performed when a downstream node receives a GET_LSA message. When the downstream node receives the request, the downstream node first acknowledges the request by sending back a positive response to the sending node (step 400). The downstream node then looks up the requested LSA's in its link state database (step 410) and builds two lists, list A and list B (step 420). The first list, list A, contains entries that were received from the sender of the GET_LSA request. The second list, list B, contains entries that were received from a node other than the sender of the request, and so need to be forwarded to the sender of the GET_LSA message. All entries on list A are flagged to be deleted within LSTimeToLive, unless an update is received from neighboring nodes prior to that time (step 430). The downstream node also sends a GET_LSA request to all neighbors, except the one from which the GET_LSA message was received, requesting each neighbor's version of the LSAs on list A (step 430). If list B is non-empty (step 450), entries on list B are placed in one or more Hello packets and sent to the sender of the GET_LSA message (step 460). No such request is generated if the list is empty (step 450).

The LSA of the inactive node propagates throughout the network until the hop-count reaches MAX_HOPS. Various versions of the GET_LSA request are generated by nodes along the path, each with a varying number of requested LSA entries. An entry is removed from the request when the request reaches a node that has an instance of the requested LSA that meets the criteria of list B.

All database exchanges are expected to be reliable using the above method because received LSA's must be individually acknowledged. The acknowledgment packet contains a mask that has a "1" in all bit positions that correspond to LSA's that were received without any errors. The low-order bit corresponds to the first LSA received in the request, while the high-order bit corresponds to the last LSA. Upon receiving the response, the sender verifies the checksum of all LSA's in its database that have a corresponding "0" bit in the response. The sender then retransmits all LSA's with a valid checksum and ages out all others. An incorrect checksum indicates that the contents of the given LSA has changed while being held in the node's database. This is usually the result of a memory problem. Each node is thus required to verify the checksum of all LSA's in its database periodically.

The LS checksum is provided to ensure the integrity of LSA contents. As noted, the LS checksum is used to detect data corruption of an LSA. This corruption can occur while the advertisement is being transmitted, while the advertisement is being held in a node's database, or at other points in the networking equipment. The checksum can be formed by any one of a number of methods known to those of ordinary skill in the art, such as by treating the LSA as a sequence of 16-bit integers, adding them together using one's complement arithmetic, and then taking the one's complement of the result. Preferably, the checksum doesn't include the LSA's HOP_COUNT field, in order to allow other nodes to modify the HOP_COUNT without having to update the checksum field. In such a scenario, only the originating node is allowed to modify the contents of an LSA except for those two fields, including its checksum. This simplifies the detection and tracking of data corruption.

Specific instances of an LSA are identified by the LSA's ID field, the LSID. The LSID makes possible the detection of old and duplicate LSAs. Similar to sequence numbers, the space created by the ID is circular: the ID starts at some value (FIRST_LSID), increases to some maximum value (FIRST_LSID-1), and then goes back to FIRST_LSID+1. Preferably, the initial value is only used once during the lifetime of the LSA, which helps flush old instances of the LSA quickly from the network when the originating node is restarted. Given a large enough LSID, wrap-around will never occur, in a practical sense. For example, using a 32 bit LSID and a MinLSInterval of 5 seconds, wrap-around takes on the order of 680 years.

LSIDs must be such that two LSIDs can be compared and the greater (or lesser) of the two identified, or a failure of the comparison indicated. Given two LSIDs x and y, x is considered to be less than y if either $$|x-y| < 2^{(LSIDLength-1)} \text{ and } x < y$$

or $$|x-y| > 2^{(LSIDLength-1)} \text{ and } x > y$$

is true. The comparison fails if the two LSIDs differ by more than $2^{(LSIDLength-1)}$.

Sending, Receiving, and Verifying LSAs

Figure 5:
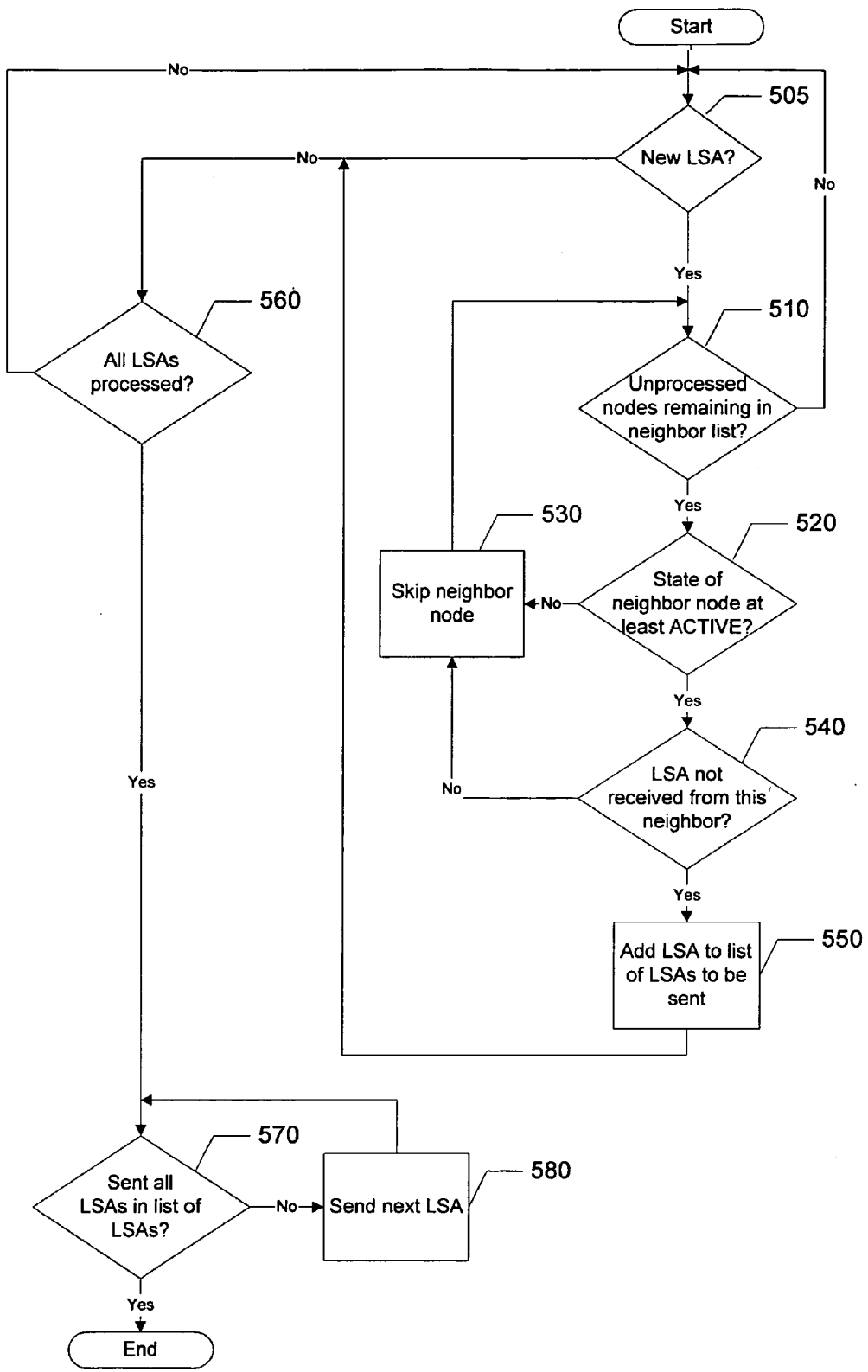
FIG. 5 is a flow diagram illustrating the actions performed in sending a Link State Advertisement (LSA).

FIG. 5 shows a flow diagram illustrating the actions performed in sending link state information using LSAs. As noted, each node is required to send a periodic Hello message on each of its active links. Such packets are usually empty (a null Hello packet), except when changes are made to the database, either through local actions or received advertisements. FIG. 5 illustrates how a given node decides which LSAs to send, when, and to what neighbors. It should be noted that each Hello message may contain several LSAs that are acknowledged as a group by sending back an appropriate response to the node sending the Hello message.

For each new LSA in the link state database (step 500), then, the following steps are taken. If the LSA is new, several actions are performed. For each node in the neighbor list (step 510), the state of the neighboring node is determined. If the state of the neighboring node is set to a value of less than ACTIVE, that node is skipped (steps 520 and 530). If the state of the neighboring node is set to a value of at least ACTIVE and if the LSA was received from this neighbor (step 540), the given neighbor is again skipped (step 530). If the LSA was not received from this neighbor (step 540), the LSA is added to the list of LSAs that are waiting to be sent by adding the LSA to this neighbor's LSAsToBeSent list (step 550). Once all LSAs have been processed (step 560), requests are sent out. This is accomplished by stepping through the list of LSAs to be sent (steps 570 and 580). Once all the LSAs have been sent, the process is complete.

Figure 6:
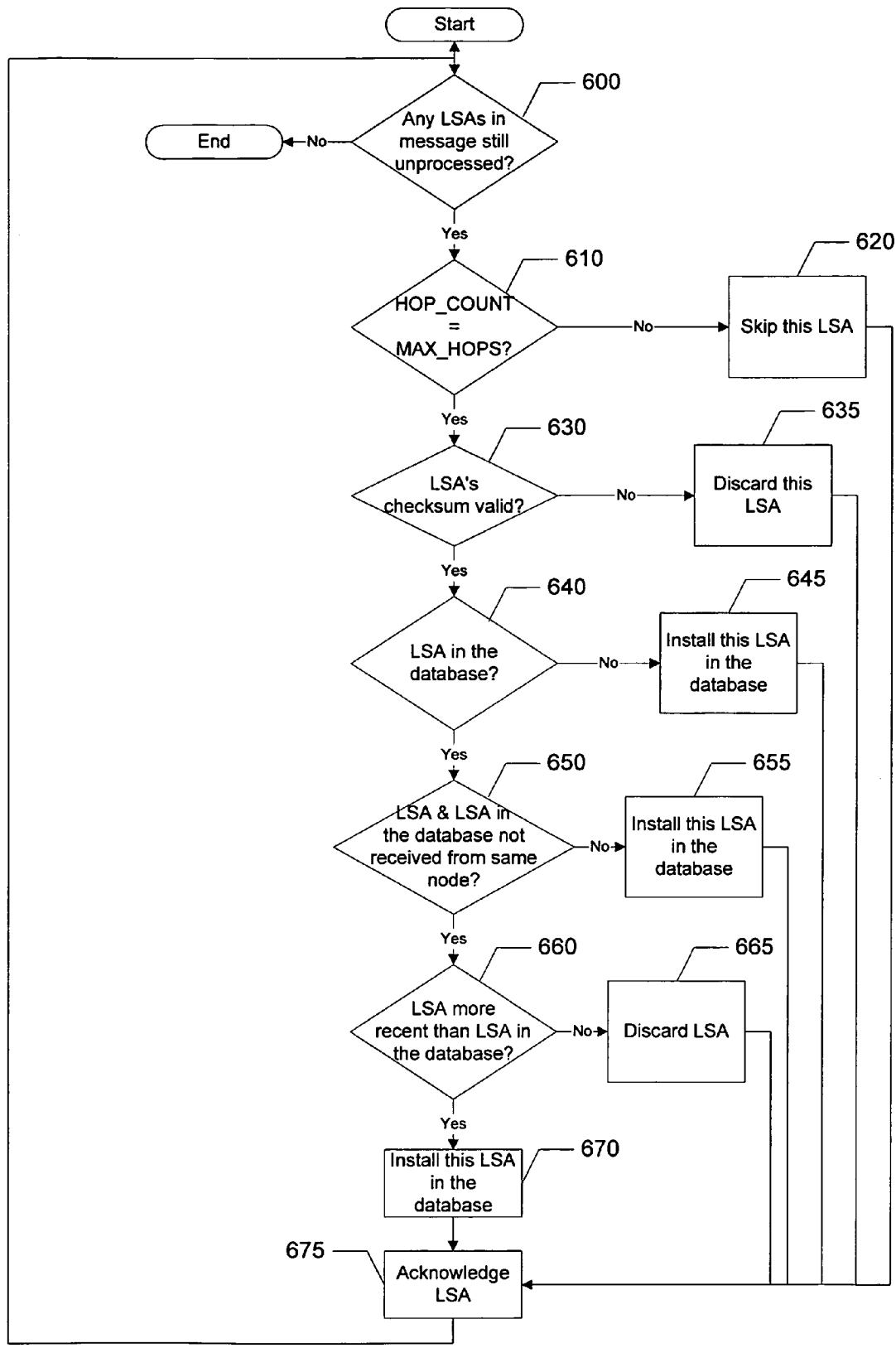
FIG. 6 is a flow diagram illustrating the actions performed in receiving an LSA.

FIG. 6 illustrates the steps performed by a node that is receiving LSAs. As noted, LSAs are received in Hello messages. Each Hello message may contain several distinct LSAs that must be acknowledged as a group by sending back an appropriate response to the node from which the Hello packet was received. The process begins at step 600, where the received Hello message is analyzed to determine whether any LSAs requiring acknowledgment are contained therein. An LSA requiring processing is first analyzed to determine if the HOP_COUNT is equal to MAX_HOPS (step 610). This indicates that HOP_COUNT was incremented past MAX_HOPS by a previous node, and implies that the originating node is too far from the receiving node to be useful. If this is the case, the current LSA is skipped (step 620). Next, the LSA's checksum is analyzed to ensure that the data in the LSA is valid (step 630). If the checksum is not valid (i.e., indicates an error), the LSA is discarded (step 435).

Otherwise, the node's link state database is searched to find the current LSA (step 640), and if not found, the current LSA is written into the database (step 645). If the current LSA is found in the link state database, the current LSA and the LSA in the database are compared to determine if they were sent from the same node (step 650). If the LSAs were from the same node, the LSA is installed in the database (step 655). If the LSAs were not from the same node, the current LSA is compared to the existing LSA to determine which of the two is more recent (step 660). The process for determining which of the two LSAs is more recent is discussed in detail below in reference to FIG. 7. If the LSA stored in the database is the more recent of the two, the LSA received is simply discarded (step 665). If the LSA in the database is less recent than the received LSA, the new LSA is installed in the database, overwriting the existing LSA (step 670). Regardless of the outcome of this analysis, the LSA is then acknowledged by sending back an appropriate response to the node having transmitted the Hello message (step 675).

The operations referred to herein may be modules or portions of modules (e.g., software, firmware, or hardware modules). For example, although the described embodiment includes software modules and/or includes manually entered user commands, the various exemplary modules may be application specific hardware modules. The software modules discussed herein may include script, batch, or other executable files, or combinations and/or portions of such files. The software modules may include a computer program or subroutines thereof encoded on computer-readable media.

Additionally, those skilled in the art will recognize that the boundaries between modules are merely illustrative and alternative embodiments may merge modules or impose an alternative decomposition of functionality of modules. For example, the modules discussed herein may be decomposed into sub-modules to be executed as multiple computer processes. Moreover, alternative embodiments may combine multiple instances of a particular module or sub-module. Furthermore, those skilled in the art will recognize that the operations described in exemplary embodiment are for illustration only. Operations may be combined or the functionality of the operations may be distributed in additional operations in accordance with the invention. The preceding discussion applies to the flow diagram depicted in FIG. 6, as well as to all other flow diagrams and software descriptions provided herein.

The software modules described herein may be received, for example, by the various hardware modules of a network node, such as that contemplated herein, from one or more computer readable media. The computer readable media may be permanently, removably or remotely coupled to the given hardware module. The computer readable media may non-exclusively include, for example, any number of the following: magnetic storage media including disk and tape storage media; optical storage media such as compact disk media (e.g., CD-ROM, CD-R, etc.) and digital video disk storage media; nonvolatile memory storage memory including semiconductor-based memory units such as FLASH memory, EEPROM, EPROM, ROM or application specific integrated circuits; volatile storage media including registers, buffers or caches, main memory, RAM, etc.; and data transmission media including computer network, point-to-point telecommunication, and carrier wave transmission media. In a UNIX-based embodiment, the software modules may be embodied in a file which may be a device, a terminal, a local or remote file, a socket, a network connection, a signal, or other expedient of communication or state change. Other new and various types of computer-readable media may be used to store and/or transmit the software modules discussed herein.

Figure 7:
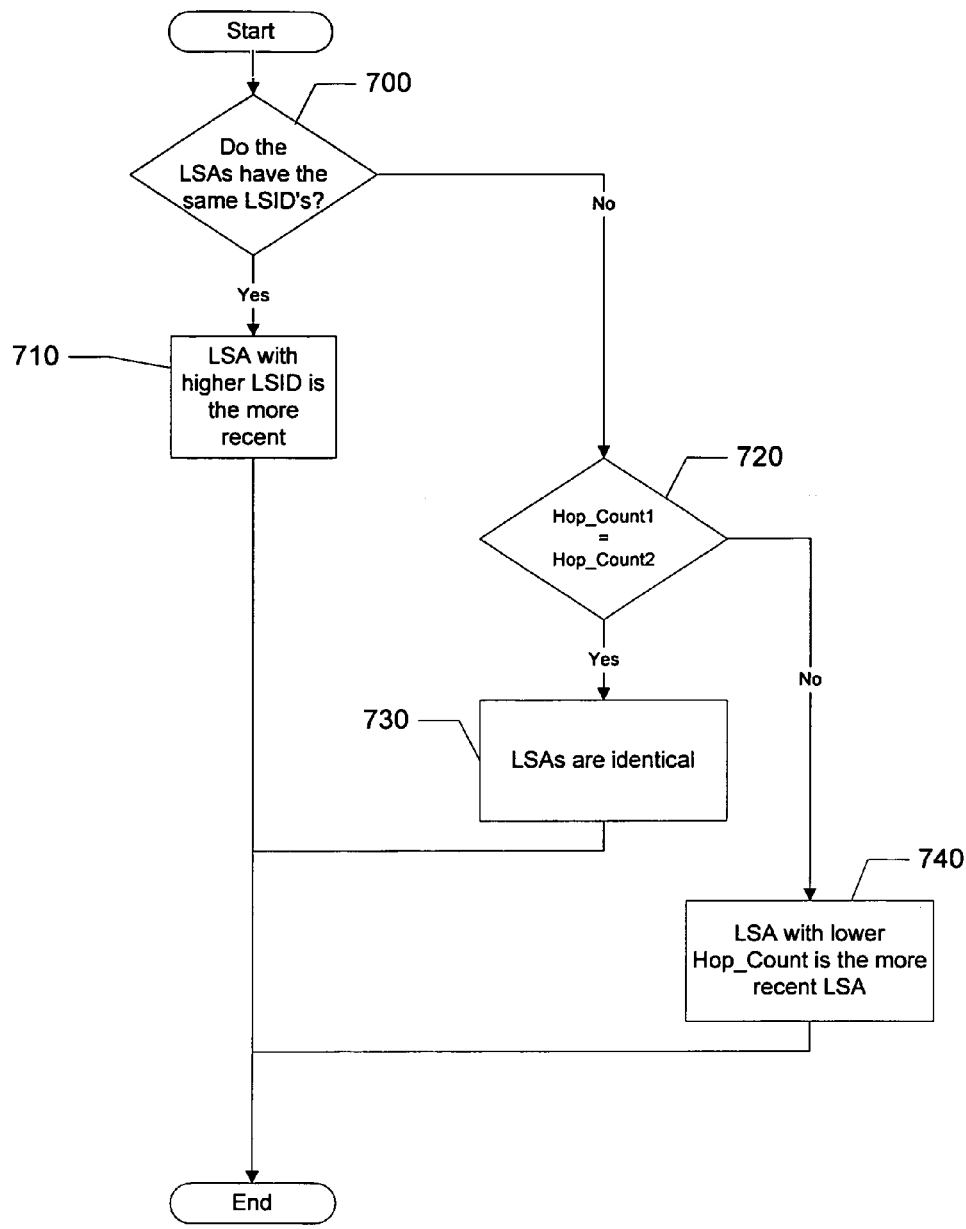
FIG. 7 is a flow diagram illustrating the actions performed in determining which of two LSAs is the more recent.

FIG. 7 illustrates one method of determining which of two LSAs is the more recent. An LSA is identified by the Node ID of its originating node. For two instances of the same LSA, the process of determining the more recent of the two begins at step 700 by comparing the LSAs LSIDs. In one embodiment of the protocol, the special ID FIRST_LSID is considered to be higher than any other ID. If the LSAs LSIDs are different, the LSA with the higher LSID is the more recent of the two (step 710). If the LSAs have the same LSIDs, then HOP_COUNTs are compared (step 720). If the HOP_COUNTs of the two LSAs are equal then the LSAs are identical and neither is more recent than the other (step 730). If the HOP_COUNTs are not equal, the LSA with the lower HOP_COUNT is used (step 740). Normally, however, the LSAs will have different LSIDs.

The basic flooding mechanism in which each packet is sent to all active neighbors except the one from which the packet was received can result in a relatively large number of copies of each packet. This is referred to herein as a broadcast storm. The severity of broadcast storms can be limited by one or more of the following optimizations:

1. In order to prevent a single LSA from generating an infinite number of offspring, each LSA can be configured with a HOP_COUNT field. The field, which is initialized to zero by the originating node, is incremented at each hop and, when MAX_HOP is reached, propagation of the LSA ceases.
2. Nodes can be configured to record the node ID of the neighbor from which they received a particular LSA and then never send the LSA to that neighbor.
3. Nodes can be prohibited from generating more than one new instance of an LSA every MinLSAInterval interval (a minimum period defined in the LSA that can be used to limit broadcast storms by limiting how often an LSA may be generated or accepted (See FIG. 15 and the accompanying discussion)).
4. Nodes can be prohibited from accepting more than one new instance of an LSA less than MinLSAInterval "younger" than the copy they currently have in the database.
5. Large networks can be divided into broadcast zones as previously described, where a given instance of a flooded packed isn't allowed to leave the boundary of its originating node's zone. This optimization also has the side benefit of reducing the round trip time of packets that require an acknowledgment from the target node.

Every node establishes adjacency with all of its neighbors. The adjacencies are used to exchange Hello packets with, and to determine the status of the neighbors. Each adjacency is represented by a neighbor data structure that contains information pertinent to the relationship with that neighbor. The following fields support such a relationship:

TABLE 2

Fields in the neighbor data structure.

| | |
|---|---|
| State | The state of the adjacency |
| NodeID | Node ID of the neighbor |
| Inactivity Timer | A one-shot timer, the expiration of which indicates that no Hello packet has been seen from this neighbor since the last HelloDeadInterval seconds. |
| HelloInterval | This is how often the neighbor wants us to send Hello packets. |
| HelloDeadInterval | This is the length of time to wait before declaring the neighbor dead when the neighbor stops sending Hello packets |
| LinkControlBlocks | A list of all links that exist between the two neighbors. |

Preferably, a node maintains a list of neighbors and their respective states locally. A node can detect the states of is neighbors using a set of "neighbor states," such as the following:

1. DOWN. This is the initial state of the adjacency, and indicates that no valid protocol packets have been received from the neighbor.
2. INIT-SENT. This state indicates that the local node has sent an INIT request to the neighbor, and that an INIT response is expected.
3. INIT-RECEIVED. This state indicates that an INIT request was received, and acknowledged by the local node. The node is still awaiting an acknowledgment for its own NIT request from the neighbor.
4. EXCHANGE. In this state the nodes are exchanging database.

5. ACTIVE. This state is entered from the Exchange State once the two databases have been synchronized. At this stage of the adjacency, both neighbors are in full sync and ready to process other protocol packets.

6. ONE-WAY. This state is entered once an initialization message has been sent and an acknowledgement of that packet received, but before an initialization message is received from the neighboring node.

Figure 8:
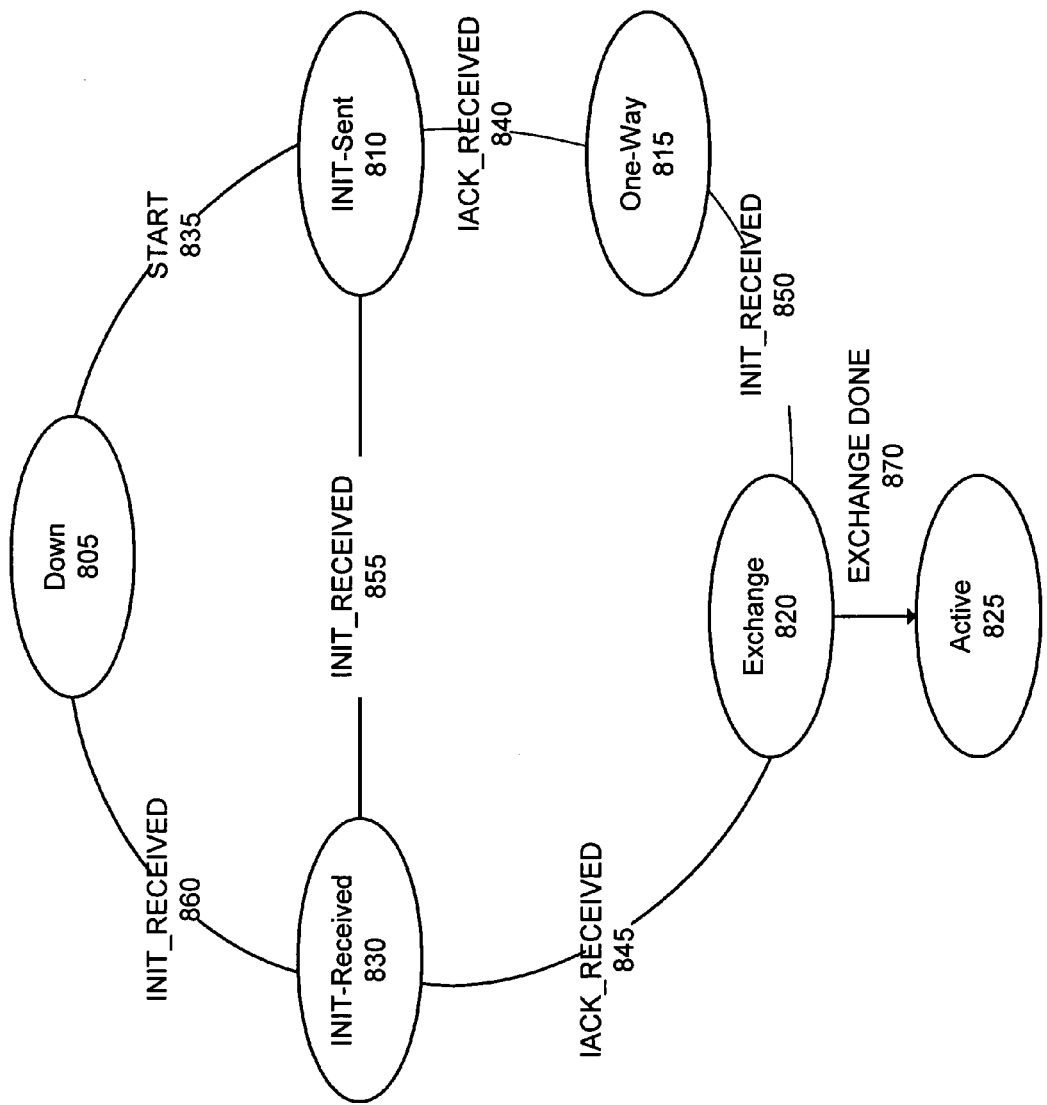
FIG. 8 is a state diagram of a Hello Machine according to the present invention.

FIG. 8 illustrates a Hello state machine (HSM) 800 according to the present invention. HSM 800 keeps track of adjacencies and their states using a set of states such as those above and transitions therebetween. Preferably, each node maintains a separate instance of HSM 800 for each of its neighbors. HSM 800 is driven by a number of events that can be grouped into two main categories: internal and external. Internal events include those generated by timers and other state machines. External events are the direct result of received packets and user actions. Each event may produce different effects, depending on the current state of the adjacency and the event itself. For example, an event may:

1. Cause a transition into a new state.
2. Invoke zero or more actions.
3. Have no effect on the adjacency or its state.

HSM 800 includes a Down state 805, an INIT-Sent state 810, a ONE-WAY state 815, an EXCHANGE state 820, an ACTIVE state 825, and an INIT-Received state 830. HSM 800 transitions between these states in response to a START transition 835, IACK_RECEIVED transitions 840 and 845, INIT_RECEIVED transitions 850, 855, and 860, and an EXCHANGE DONE transition 870 in the manner described in Table 3. It should be noted that the Disabled state mentioned in Table 3 is merely a fictional state representing a non-existent neighbor and, so, is not shown in FIG. 8 for the sake of clarity. Table 3 shows state changes, their causing events, and resulting actions.

TABLE 3

HSM transitions.

| Current State | Event | New State | Action |
|---|---|---|---|
| Disabled | all | Disabled (no change) | None |
| Down | START - Initiate the adjacency establishment process | Init-Sent | Format and send an INIT request, and start the retransmission timer. |
| Down | INIT_RECEIVED - The local node has received an INIT request from its neighbor | Init-Received | Format and send an INIT reply and an INIT request; start the retransmission timer |
| Init-Sent | INIT_RECEIVED - local node has received INIT request from neighbor | Init-Received | Format and send an INIT reply |
| Init-Sent | IACK_RECEIVED - The local node has received a valid positive response to the INIT request | One-Way | None |
| Init-Received | IACK_RECEIVED - The local node has received a valid positive response to the INIT request. | Exchange | Format and send a Hello request. |
| One-Way | INIT_RECEIVED - The local node has received an INIT request from the neighbor | Exchange | Format and send an INIT reply |

TABLE 3-continued

HSM transitions.

| Current State | Event | New State | Action |
|---|---|---|---|
| Exchange | EXCHANGE_DONE - The local node has successfully completed the database synchronization phase of the adjacency establishment process. | Active | Start the keep-alive and inactivity timers. |
| All states, except Down | HELLO_RECEIVED - The local node has received a valid Hello packet from its neighbor. | No change | Restart Inactivity timer |
| Init-Sent, Init-Received, Exchange | TIMER_EXPIRED - The retransmission timer has expired | Depends on the action taken | Change state to Down if MaxRetries has been reached. Otherwise, increment the retry counter and re-send the request (INIT if current state is Init-Sent or Init-Received. Hello otherwise). |
| Active | TIMER_EXPIRED - The keep-alive timer has expired. | Depends on the action taken. | Increment inactivity counter by Hello-Interval and if the new value exceeds Hello-DeadInterval, then general a LINK_DOWN event. |
| All states, except Down | LINK_DOWN - All links between the two nodes have failed and the neighbor is now unreachable. | Down | Timeout all database entries previously received from this neighbor. |
| All states, except Down | PROTOCOL_ERROR - An unrecoverable protocol error has been detected on this adjacency. | Down | Timeout all database entries previously received from this neighbor. |

It will be noted that the TIMER_EXPIRED event indicates that the local node has not received a valid Hello packet from the neighbor in at least HelloDeadInterval seconds. Otherwise, the neighbor is still alive, so the keep-alive timer is simply restarted.

After the successful exchange of INIT packets, the two neighbors enter the Exchange State. Exchange is a transitional state that allows both nodes to synchronize their databases before entering the Active State. Database synchronization involves exchange of one or more Hello packets that transfer the contents of one node's database to the other. A node should not send a Hello request while its awaiting the acknowledgment of another. The exchange may be made more reliable by causing each request to be transmitted repeatedly until a valid acknowledgment is received from the adjacent node.

When a Hello packet arrives at a node, the Hello packet is processed as previously described. Specifically, the node compares each LSA contained in the packet to the copy the node currently has in its own database. If the received copy is more recent then the node's own or advertises a better hop-count, the received copy is written into the database, possibly replacing the current copy. The exchange process is normally considered completed when each node has received, and acknowledged, a null Hello request from its neighbor. The nodes then enter the Active State with fully synchronized databases which contain the most recent copies of all LSAs known to both neighbors.

A sample exchange using the Hello protocol is described in Table 4. In the following exchange, node 1 has four LSAs in its database, while node 2 has none.

TABLE 4

Sample exchange.

| Node 1 | Node 2 |
|---|---|
| Send Hello Request | Send Hello Request |
| Sequence: 1 | Sequence: 1 |
| Contents: LSA1, LSA2, LSA2, LSA4 | Contents: null |
| Send Hello Response | Send Hello Response |
| Sequence: 1 | Sequence: 1 |
| Contents: null | Contents: 0x000f (acknowledges all four LSAs) |
| Send Hello Request | Send Hello Response |
| Sequence: 2 | Sequence: 2 |
| Contents: null (no more entries) | Contents: null |

Another example is the exchange described in table 5. In the following exchange, node 1 has four LSAs (1 through 4) in its database, and node 2 has 7 (3 and 5 through 10). Additionally, node 2 has a more recent copy of LSA3 in its database than node 1.

TABLE 5

Sample exchange.

| Node 1 | Node 2 |
|---|---|
| Send Hello Request | Send Hello Request |
| Sequence: 1 | Sequence: 1 |
| Contents: LSA1, LSA2, LSA2, LSA4 | Contents: LSA3, LSA5, LSA6, LSA7 |
| Send Hello Response | Send Hello Response |
| Sequence: 1 | Sequence: 1 |
| Contents: null | Contents: 0x000f (acknowledges all four LSAs) |
| Send Hello Request | Send Hello Response |
| Sequence: 2 | Sequence: 2 |
| Contents: null (no more entries) | Contents: LSA8, LSA9, LSA10 |
| Send Hello Response | Send Hello Response |
| Sequence: 2 | Sequence: 2 |
| Contents: 0x0007 (acknowledges all three LSAs) | Contents: null |
| Send Hello Response | Send Hello Request |
| Sequence: 3 | Sequence: 3 |
| Contents: null | Contents: null (no more entries) |

At the end of the exchange, both nodes will have the most recent copy of all 10 LSAs (1 through 10) in their databases.

Provisioning

For each VP that is to be configured (or, as also referred to herein, provisioned), a physical path must be selected and configured. VPs may be provisioned statically or dynamically. For example, a user can identify the nodes through which the VP will pass and manually configure each node to support the given VP. The selection of nodes may be based on any number of criteria, such as QoS, latency, cost, and the like. Alternatively, the VP may be provisioned dynamically using any one of a number of methods, such as a shortest path first technique or a distributed technique. A shortest path first technique might, for example, employ an embodiment of the present invention. An example of a distributed technique is the restoration method described subsequently herein.

Failure Detection, Propagation, and Restoration

Failure Detection and Propagation

In one embodiment of networks herein, failures are detected using the mechanisms provided by the underlying physical network. For example, when using a SONET network, a fiber cut on a given link results in a loss of signal (LOS) condition at the nodes connected by that link. The LOS condition propagated an Alarm Indication Signal (AIS) downstream, and Remote Defect Indication (RDI) upstream (if the path still exists), and an LOS defect locally. Later, the defect is upgraded to a failure 2.5 seconds later, which causes an alarm to be sent to the Operations System (OS) (per Bellcore's recommendations in GR-253 (GR-253: *Synchronous Optical Network (SONET) Transport Systems*, Common Generic Criteria, Issue 2 [Bellcore, December 1995], included herein by reference, in its entirety and for all purposes)). Preferably when using SONET, the handling of the LOS condition follows Bellcore's recommendations in GR-253, which allows nodes to inter-operate, and co-exist, with other network equipment (NE) in the same network. The mesh restoration protocol is invoked as soon as the LOS defect is detected by the line card, which occurs 3 ms following the failure (a requirement under GR-253).

The arrival of the AIS at the downstream node causes a similar alarm to be sent to the downstream node's downstream neighbor and for that node to send an AIS to its own downstream neighbor. This continues from node to node until the AIS finally reaches the source node of the affected VP, or a proxy border node if the source node is located in a different zone. In the latter case, the border node restores the VP on behalf of the source node. Under GR-253, each node is allowed a maximum of 125 microseconds to forward the AIS downstream, which quickly propagates failures toward the source node.

Once a node has detected a failure on one of its links, either through a local LOS defect or a received AIS indication, the node scans its VP table looking for entries that have the failed link in their path. When the node finds one, the node releases all link bandwidth used by the VP. Then, if the node is a VP's source node or a proxy border node, the VP's state is changed to RESTORING and the VP placed on a list of VPs to be restored. Otherwise (if the node isn't the source node or a proxy border node), the state of the VP is changed to DOWN, and a timer is started to delete the VP from the database if a corresponding restore-path request isn't received from the origin node within a certain timeout period. The VP list that was created in the previous step is ordered by quality of service (QoS), which ensures that VPs with a higher QoS setting are restored first. Each entry in the list contains, among other things, the ID of the VP, its source and destination nodes, configured QoS level, and required bandwidth.

Figure 9:
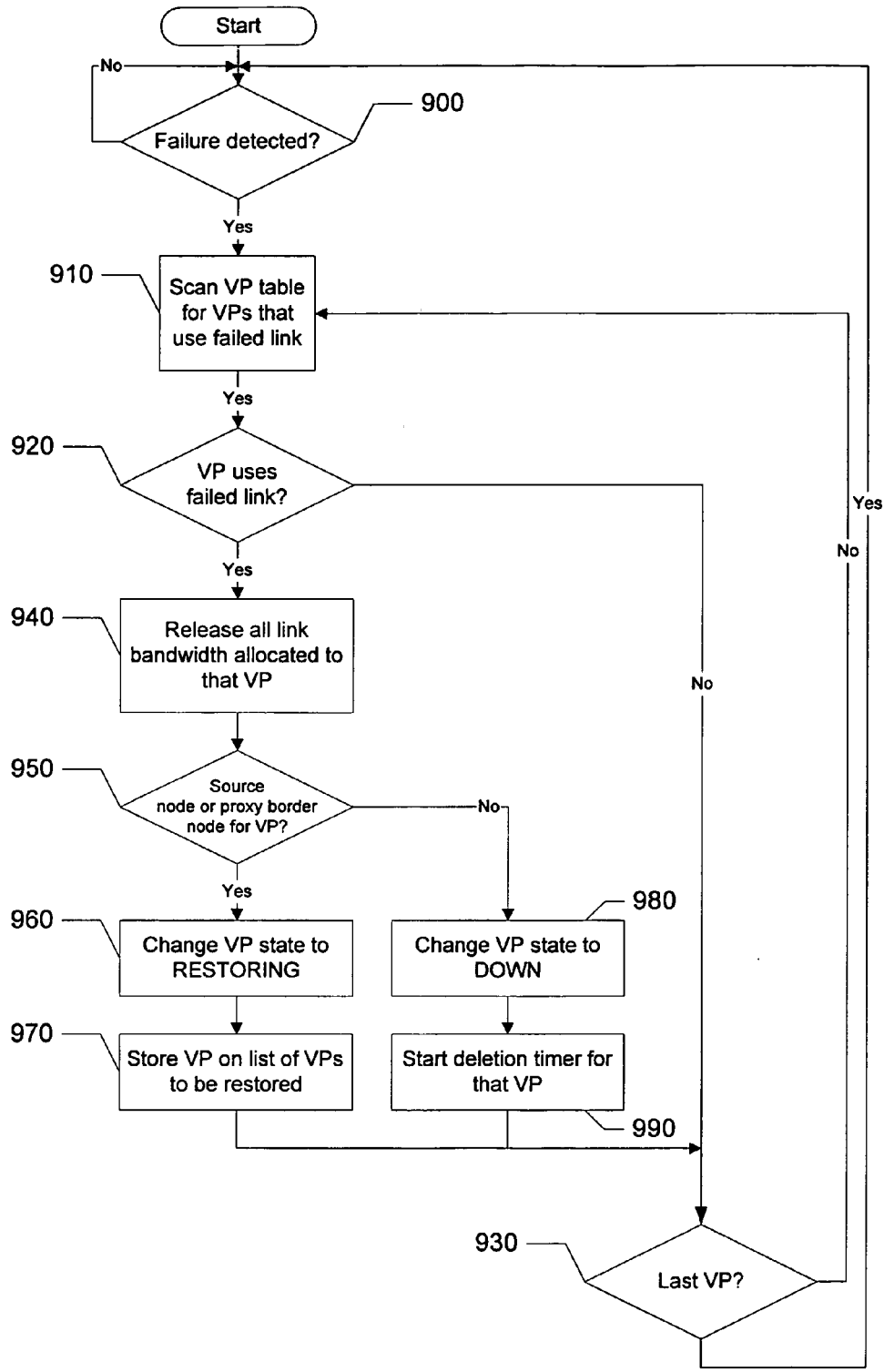
FIG. 9 is a flow diagram illustrating the actions performed in preparation for path restoration in response to a link failure.

FIG. 9 illustrates the steps performed in response to the failure of a link. As noted, the failure of a link results in a LOS condition at the nodes connected to the link and generates an AIS downstream and an RDI upstream. If an AIS or RDI were received from a node, a failure has been detected (step 900). In that case, each affected node performs several actions in order to maintain accurate status information with regard to the VPs that the given node currently supports. The first action taken in such a case, is that the node scans its VP table looking for entries that have the failed link in their path (steps 910 and 920). If the VP does not use the failed link, the node goes to the next VP in the table and begins analyzing that entry (step 930). If the selected VP uses the failed link, the node releases all link bandwidth allocated to that VP (step 940). The node then determines whether it is a source node or a proxy border node for the VP (step 950). If this is the case, the node changes the VP's state to RESTORING (step 960) and stores the VP on the list of VPs to be restored (step 970). If the node is not a source node or proxy border node for the VP, the node changes the VP state to DOWN (step 980) and starts a deletion timer for that VP (step 990).

Failure Restoration

For each VP on the list, the node then sends an RPR to all eligible neighbors in order to restore the given VP. The network will, of course, attempt to restore all failed VPs. Neighbor eligibility is determined by the state of the neighbor, available link bandwidth, current zone topology, location of the Target node, and other parameters. One method for determining the eligibility of a particular neighbor follows:

1. The origin node builds a shortest path first (SPF) tree with "self" as root. Prior to building the SPF tree, the link-state database is pruned of all links that either don't have enough (available) bandwidth to satisfy the request, or have been assigned a QoS level that exceeds that of the VP being restored.
2. The node then selects the output link(s) that can lead to the target node in less than MAX_HOPS hops. The structure and contents of the SPF tree generated simplifies this step.

The RPR carries information about the VP, such as:

1. The Node IDs of the origin and target nodes.
2. The ID of the VP being restored.
3. A locally unique sequence number that gets incremented by the origin node on every retransmission of the request. The sequence number, along with the Node and VP IDs, allow specific instances of an RPR to be identified by the nodes.
4. A field that carries the distance, in hops, between the origin node and the receiving node. This field is initially set to zero by the originating node, and is incremented by 1 by each node along the path.
5. An array of link IDs that records the path of the message on its trip from the origin node to the target node.

Due to the way RPR messages are forwarded by tandem nodes and the unconditional and periodic retransmission of such messages by origin nodes, multiple instances of the same request are not uncommon, even multiple copies of each instance, circulating the network at any given time. To minimize the amount of broadcast traffic generated by the protocol and aid tandem nodes in allocating bandwidth fairly for competing RPRs, tandem nodes preferably execute a sequence such as that described subsequently.

The term "same instance," as used below, refers to messages that carry the same VP ID, origin node ID, and hop-count, and are received from the same tandem node (usually, the same input link, assuming only one link between nodes). Any two messages that meet the above criteria are guaranteed to have been sent by the same origin node, over the same link, to restore the same VP, and to have traversed the same path. The terms "copy of an instance," or more simply "copy" are used herein to refer to a retransmission of a given instance. Normally, tandem nodes select the first instance they receive since in most, but not all cases, as the first RPR received normally represents the quickest path to the origin node. A method for making such a determination was described in reference to FIG. 5. Because such information must be stored for numerous RPRs, a standard data structure is defined under a protocol of the present invention.

The Restore-Path Request Entry (RPRE) is a data structure that maintains information about a specific instance of a RPRE packet. Tandem nodes use the structure to store information about the request, which helps them identify and reject other instances of the request, and allows them to correlate received responses with forwarded requests. Table 6 lists an example of the fields that are preferably present in an RPRE.

TABLE 6

RPR Fields

| Field | Usage |
|---|---|
| Origin Node | The Node ID of the node that originated this request. This is either the source node of the VP or a proxy border node. |
| Target Node | Node ID of the target node of the restore path request. This is either the destination node of the VP or a proxy border node. |
| Received From | The neighbor from which we received this message. |
| First Sequence Number | Sequence number of the first received copy of the corresponding restore-path request. |
| Last Sequence Number | Sequence number of the last received copy of the corresponding restore-path request. |
| Bandwidth | Requested bandwidth |
| QoS | Requested QoS |
| Timer | Used by the node to timeout the RPR |
| T-Bit | Set to 1 when a Terminate indicator is received from any of the neighbors. |
| Pending Replies | Number of the neighbors that haven't acknowledged this message yet. |
| Sent To | A list of all neighbors that received a copy of this message. Each entry contains the following information about the neighbor:<br>AckReceived: Indicates if a response has been received from this neighbor.<br>F-Bit: Set to 1 when Flush indicator from this neighbor. |

When an RPR packet arrives at a tandem node, a decision is made as to which neighbor should receive a copy of the request. The choice of neighbors is related to variables such as link capacity and distance. Specifically, a particular neighbor is selected to receive a copy of the packet if:

1. The output link has enough resources to satisfy the requested bandwidth. Nodes maintain a separate "available bandwidth" counter for each of the defined QoS levels (e.g. QoS0-2 and QoS3). VPs assigned to certain QoS level, say "n," are allowed to use all link resources reserved for that level and all levels below that level, i.e., all resources reserved for levels 0 through n, inclusive.
2. The path through the neighbor is less than MAX_HOPS in length. In other words, the distance from this node to the target node is less than MAX_HOPS minus the distance from this node to the origin node.
3. The node hasn't returned a Flush response for this specific instance of the RPR, or a Terminate response for this or any other instance.

The Processing of Received RPRs

Figure 10:
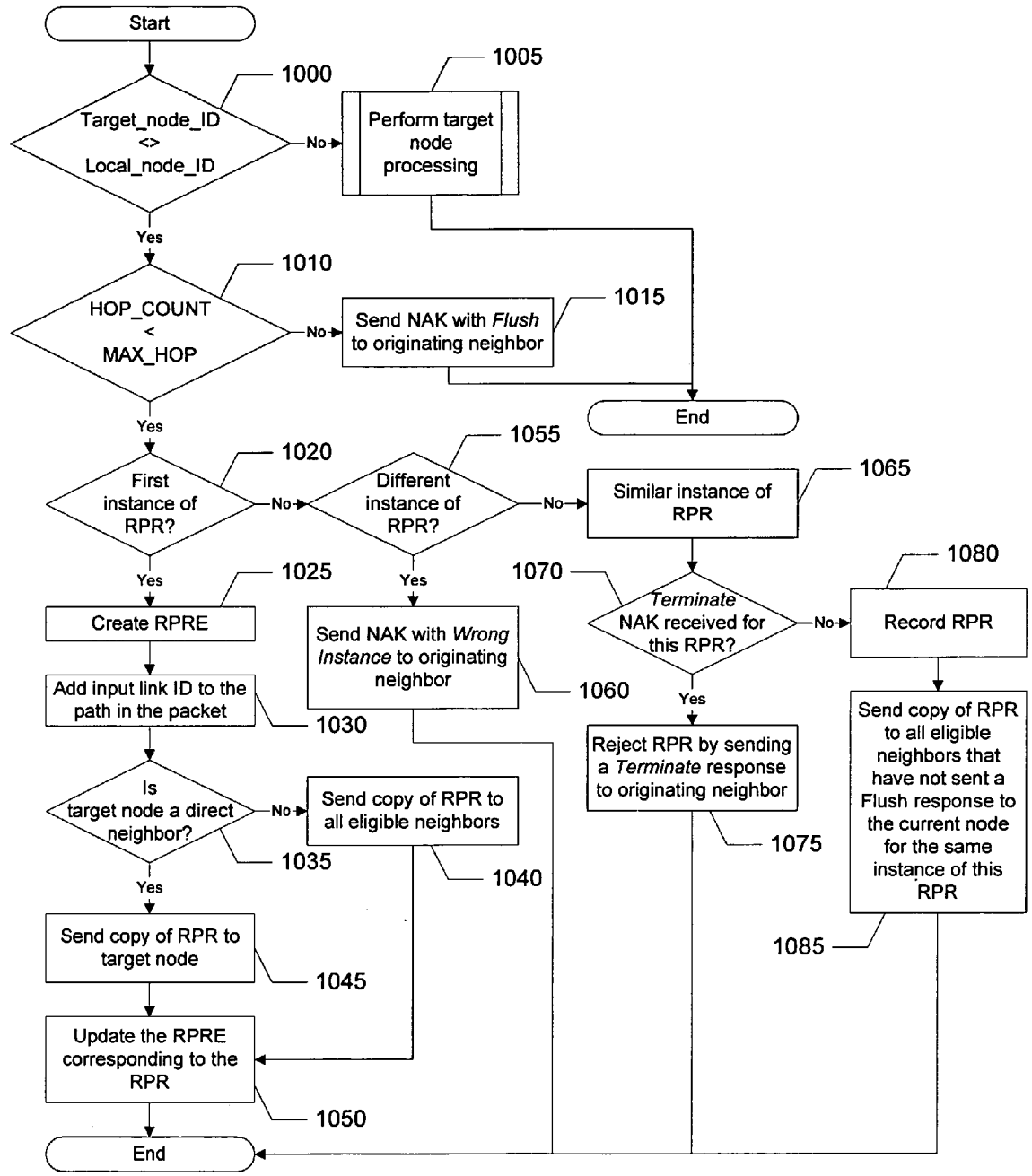
FIG. 10 is a flow diagram illustrating the actions performed in processing received Restore-Path Requests (RPR) executed by tandem nodes.

FIG. 10 illustrates the actions performed by tandem nodes in processing received RPR tests. Assuming that this is the first instance of the request, the node allocates the requested bandwidth on eligible links and transmits a modified copy of the received message onto them. The bandwidth remains allocated until a response (either positive or negative) is received from the neighboring node, or a positive response is received from any of the other neighbors (see Table 7 below). While awaiting a response from its neighbors, the node cannot use the allocated bandwidth to restore other VPs, regardless of their priority (i.e. QoS).

Processing of RPRs begins at step 1000, in which the target node's ID is compared to the local node's ID. If the local node's ID is equal to the target node's ID, the local node is the target of the RPR and must process the RPR as such. This is illustrated in FIG. 10 as step 1005 and is the subject of the flow diagram illustrated in FIG. 11. If the local node is not the target node, the RPR's HOP_COUNT is compared to MAX_HOPS in order to determine if the HOP_COUNT has exceed or will exceed the maximum number of hops allowable (step 1010). If this is the case, a negative acknowledgment (NAK) with a Flush indicator is then sent back to the originating node (step 1015). If the HOP_COUNT is still within acceptable limits, the node then determines whether this is the first instance of the RPR having been received (step 1020). If this is the case, a Restore-Path Request Entry (RPRE) is created for the request (step 1025). This is done by creating the RPRE and setting the RPRE's fields, including starting a time-to-live (TTL) or deletion timer, in the following manner:

RPRE.SourceNode=Header.Origin
RPRE.Destination Node=Header.Target
RPRE.FirstSequence Number=Hearder.SequenceNumber
RPRE.Last Sequence Number=Header.Sequence Number
RPRE.QoS=Header.Parms.RestorePath.QoS
RPRE.Bandwidth=Header.Parms.RestorePath.Bandwidth
RPRE.ReceivedFrom=Node ID of the neighbor that sent us this message
StartTimer (RPRE.Timer, RPR_TTL)

The ID of the input link is then added to the path in the RPRE (e.g., Path[PathIndex++]=LinkID) (step 1030). Next, the local node determines whether the target node is a direct neighbor (step 1035). If the target node is not a direct neighbor of the local node, a copy of the (modified) RPR is sent to all eligible neighbors (step 1040). The PendingReplies and SentTo Fields of the corresponding RPRE are also updated accordingly at this time. If the target node is a direct neighbor of the local node, the RPR is sent only to the target node (step 1045). In either case, the RPRE corresponding to the given RPR is then updated (step 1050).

If this is not the first instance of the RPR received by the local node, the local node then attempts to determine whether this might be a different instance of the RPR (step 1055). A request is considered to be a different instance if the RPR:

1. Carries the same origin node IDs in its header;
2. Specifies the same VP ID; and
3. Was either received from a different neighbor or has a different HOP_COUNT in its header.

If this is simply a different instance of the RPR, and another instance of the same RPR has been processed, and accepted, by this node, a NAK Wrong Instance is sent to the originating neighbor (step 1060). The response follows the reverse of the path carried in the request. No broadcasting is therefore necessary in such a case. If a similar instance of the RPR has been processed and accepted by this node (step 1065), the local node determines whether a Terminate NAK has been received for this RPR (step 1070). If a Terminate NAK has been received for this RPR, the RPR is rejected by sending a Terminate response to the originating neighbor (step 1075). If a Terminate NAK was not received for this RPR, the new sequence number is recorded (step 1080) and a copy of the RPR is forwarded to all eligible neighbors that have not sent a Flush response to the local node for the same instance of this RPR (step 1085). This may include nodes that weren't previously considered by this node due to conflicts with other VPs, but does not include nodes from which a Flush response has already been received for the same instance of this RPR. The local node should then save the number of sent requests in the PendingReplies field of the corresponding RPRE. The term "eligible neighbors" refers to all adjacent nodes that are connected through links that meet the link-eligibility requirements previously described. Preferably, bandwidth is allocated only once for each request so that subsequent transmissions of the request do not consume any bandwidth.

Note that the bandwidth allocated for a given RPR is released differently depending on the type of response received by the node and the setting of the Flush and Terminate indicators in its header. Table 7 shows the action taken by a tandem node when a restore path response is received from one of its neighbors.

TABLE 7

Actions taken by a tandem node upon receiving an RPR.

| Response Type | Flush Indicator? | Terminate Indicator? | Received Sequence Number | Action |
| --- | --- | --- | --- | --- |
| X | X | X | Not Valid | Ignore response |
| Negative | No | No | 1 = Last | Ignore response |
| Negative | X | No | =Last | Release bandwidth allocated for the VP on the link the response was received on |
| Negative | Yes | No | Valid | Release bandwidth allocated for the VP on the link that the response was received on |
| Negative | X | Yes | Valid | Release all bandwidth allocated for the VP |
| Positive | X | X | Valid | Commit bandwidth allocated for the VP on the link the response was received on; release all other bandwidth. |

Figure 11:
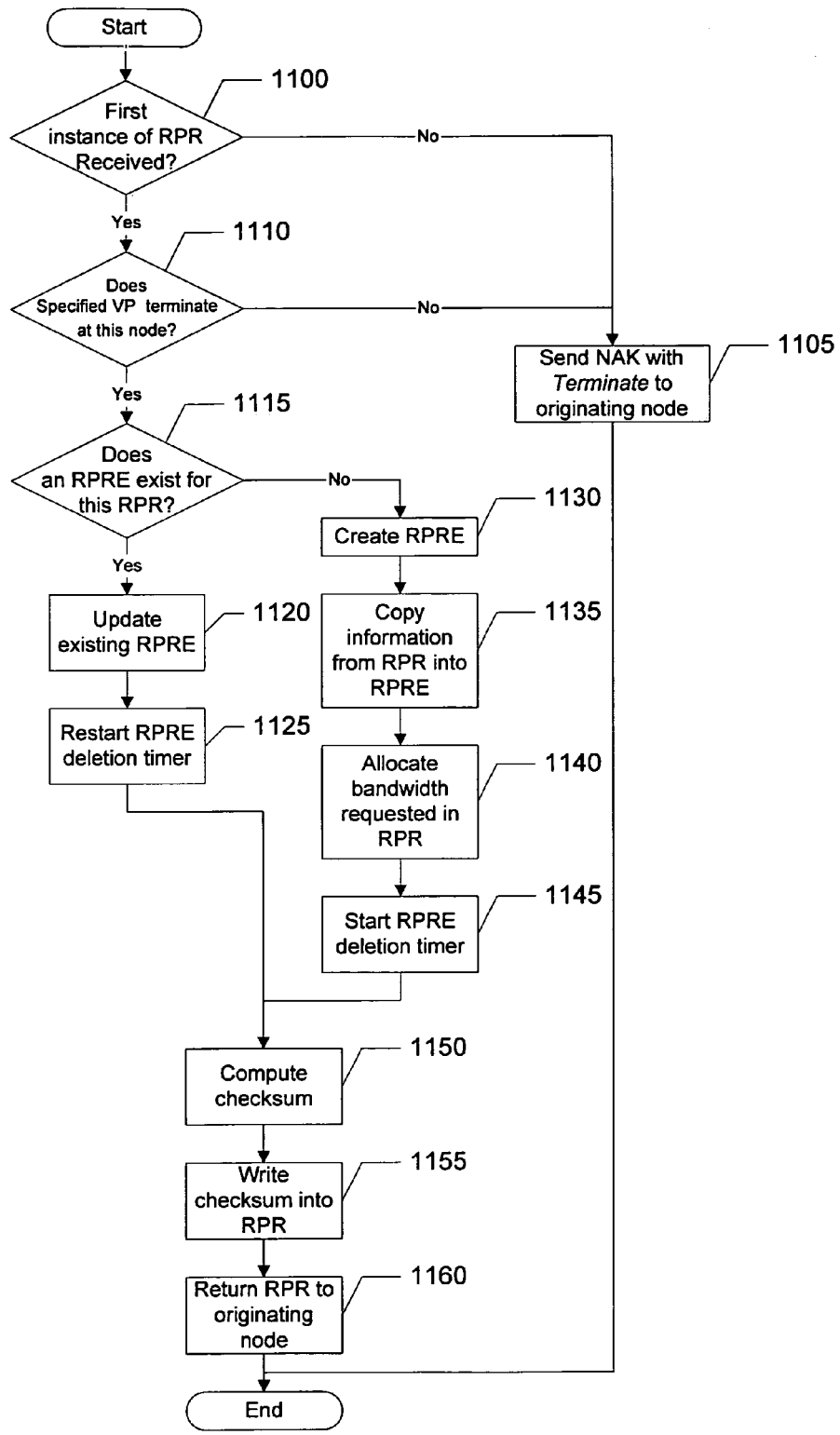
FIG. 11 is a flow diagram illustrating the actions performed in the processing of an RPR by the RPR's target node.

FIG. 11 illustrates the process performed at the target node once the RPR finally reaches that node. When the RPR reaches its designated target node, the target node begins processing of the RPR by first determining whether this is the first instance of this RPR that has been received (step 1110). If that is not the case, a NAK is sent with a Terminate indicator sent to the originating node (step 1105). If this is the first instance of the RPR received, the target node determines whether or not the VP specified in the RPR actually terminates at this node (step 1110). If the VP does not terminate at this node, the target node again sends a NAK with a Terminate to the originating node (step 1105). By sending a NAK with a Terminate indicator, resources allocated along the path are freed by the corresponding tandem nodes.

If the VP specified in the RPR terminates at this node (i.e. this node is indeed the target node), the target node determines whether an RPRE exists for the RPR received (step 1115). If an RPRE already exists for this RPR, the existing RPRE is updated (e.g., the RPRE's LastSequenceNumber field is updated) (step 1120) and the RPRE deletion timer is restarted (step 1125). If no RPRE exists for this RPR in the target node (i.e., if this is the first copy of the instance received), an RPRE is created (step 1130), pertinent information from the RPR is copied into the RPRE (step 1135), the bandwidth requested in the RPR is allocated on the input link by the target node (step 1140) and an RPRE deletion timer is started (step 1145). In either case, once the RPRE is either updated or created, a checksum is computed for the RPR (step 1150) and written into the checksum field of the RPR (step 1155). The RPR is then returned as a positive response to the origin node (step 1160). The local (target) node then starts its own matrix configuration. It will be noted that the RPRE created is not strictly necessary, but makes the processing of RPRs consistent across nodes.

The Processing of Received RPR Responses

Figure 12:
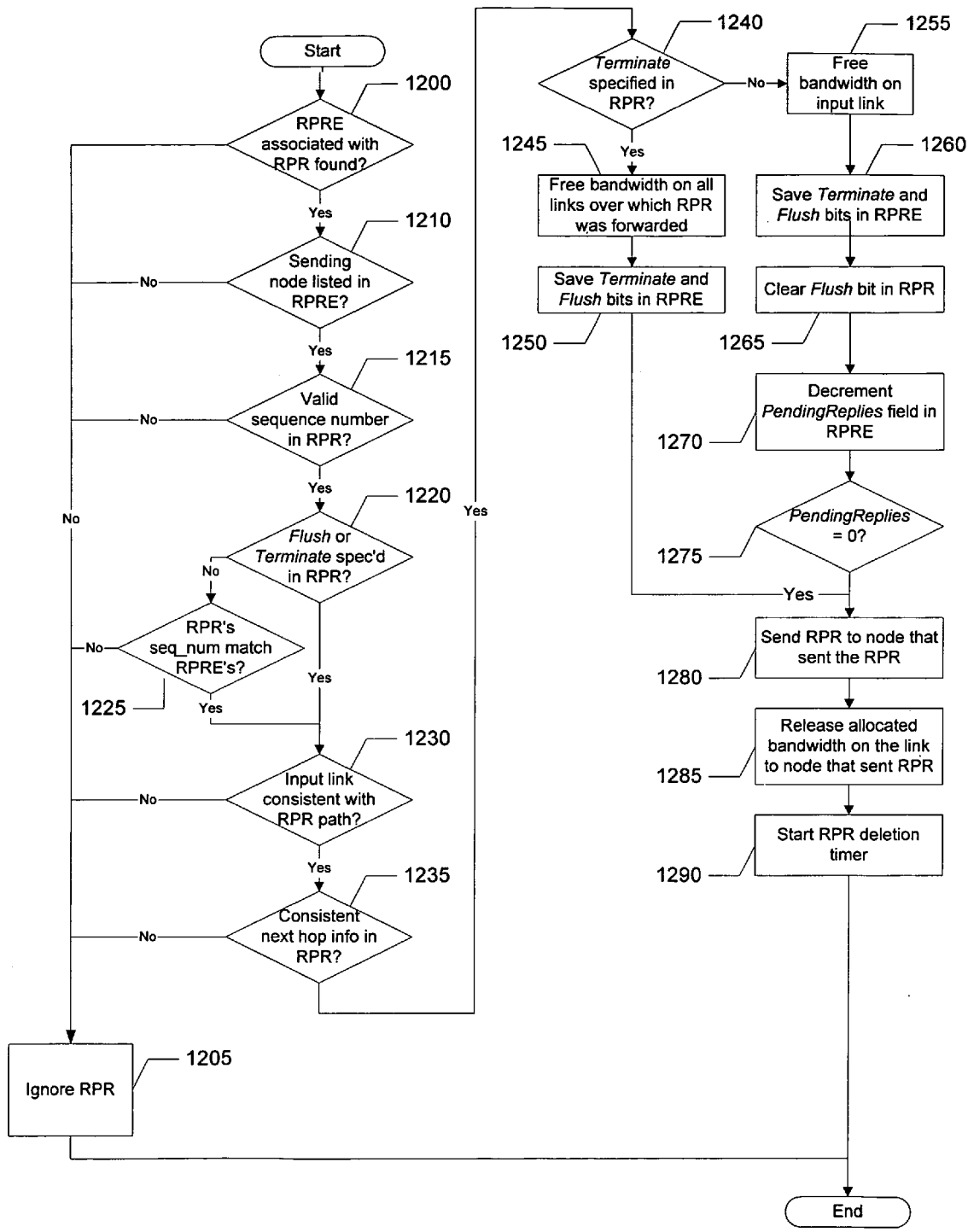
FIG. 12 is a flow diagram illustrating the actions performed in returning a negative response in response to an RPR.
Figure 13:
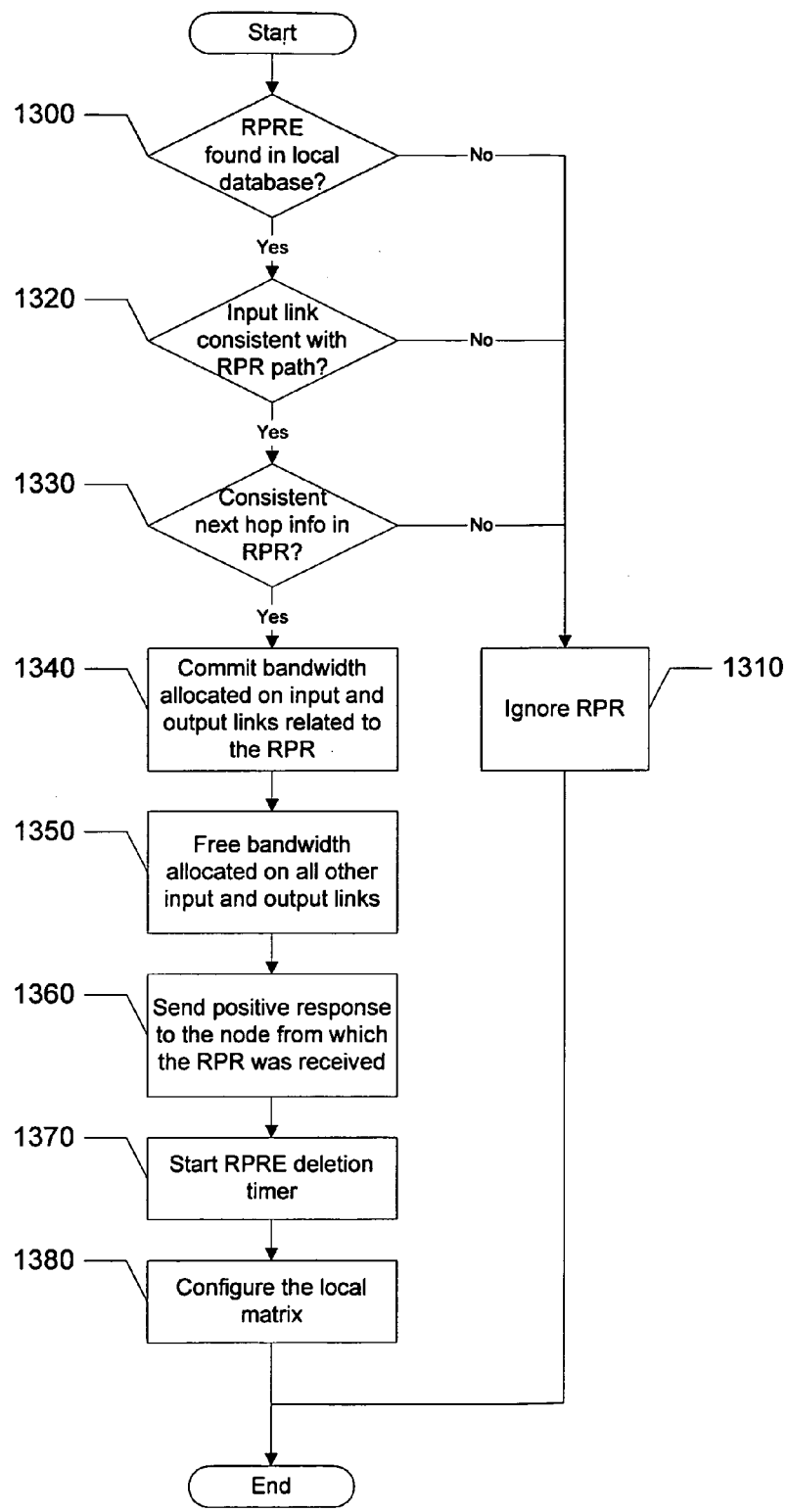
FIG. 13 is a flow diagram illustrating the actions performed in returning a positive response to a received RPR.

FIGS. 12 and 13 are flow diagrams illustrating the processes performed by originating nodes that receive negative and positive RPR responses, respectively. Negative RPR responses are processed as depicted in FIG. 12. An originating node begins processing a negative RPR response by determining whether the negative RPR response has an RPRE associated with the RPR (step 1200). If the receiving node does not have an RPRE for the received RPR response, the RPR response is ignored (step 1205). If an associated RPRE is found, the receiving node determines whether the node sending the RPR response is listed in the RPRE (e.g., is actually in the SentTo list of the RPRE) (step 1210). If the sending node is not listed in the RPRE, again the RPR response is ignored (step 1205).

If the sending node is listed in the RPRE, the RPR sequence number is analyzed for validity (step 1215). As with the previous steps, if the RPR contains an invalid sequence number (e.g., doesn't fall between FirstSequenceNumber and LastSequence Number, inclusive), the RPR response is ignored (step 1205). If the RPR sequence number is valid, the receiving node determines whether Flush or Terminate in the RPR response (step 1220). If neither of these is specified, the RPR response sequence number is compared to that stored in the last sequence field of the RPR (step 1225). If the RPR response sequence number does not match that found in the last sequence field of the RPRE, the RPR response is again ignored (step 1205). If the RPR response sequence number matches that found in the RPRE, or a Flush or Terminate was specified in the RPR, the input link on which the RPR response was received is compared to that listed in the RPR response path field (e.g., Response.Path[Response.PathIndex]==InputLinkID) (step 1230). If the input link is consistent with information in the RPR, the next hop information in the RPR is checked for consistency (e.g., Response.Path [Response.PathIndex+1]==RPRE.ReceivedFrom) (step 1235). If either of the proceeding two tests are failed the RPR response is again ignored (step 1205).

If a Terminate was specified in the RPR response (step 1240), the bandwidth on all links over which the RPR was forwarded is freed (step 1245) and the Terminate and Flush bits from the RPR response are saved in the RPRE (step 1250). If a Terminate was not specified in the RPR response, bandwidth is freed only on the input link (i.e., the link from which the response was received) (step 1255), the Terminate and Flush bits are saved in the RPRE (step 1260), and the Flush bit of the RPR is cleared (step 1265). If a Terminate was not specified in the RPR, the Pending Replies field in the RPRE is decremented (step 1270). If this field remains non-zero after being decremented, the process completes. If Pending Replies is equal to zero at this point, or a Terminate was not specified in the RPR, the RPR is sent to the node specified in the RPR's Received From field (i.e. the node that sent the corresponding request) (step 1280). Next, the bandwidth allocated on the link to the node specified in the RPR's Received From field is released (step 1285) and an RPR deletion timer is started (step 1290).

FIG. 13 illustrates the steps taken in processing positive RPR responses. The processing of positive RPR responses begins at step 1300 with a search of the local database to determine whether an RPRE corresponding to the RPR response is stored therein. If a corresponding RPRE cannot be found, the RPR response is ignored (step 1310). If the RPR response RPRE is found in the local database, the input link is verified as being consistent with the path stored in the RPR (step 1320). If the input link is not consistent with the RPR path, the RPR response is ignored once again (step 1310). If the input link is consistent with path information in the RPR, the next hop information specified in the RPR response path is compared with the Received From field of the RPRE (e.g., Response.Path[Response.PathIndex+1]!=RPRE.ReceivedFrom) (step 1330). If the next hop information is not consistent, the RPR response is again ignored (step 1310). However, if the RPR response's next hop information is consistent, bandwidth allocated on input and output links related to the RPR is committed (step 1340). Conversely, bandwidth allocated on all other input and output links for that VP is freed at this time (step 1350). Additionally, a positive response is sent to the node from which the RPR was received (step 1360), and an RPR deletion timer is started (step 1370) and the local matrix is configured (step 1380).

With regard to matrix configuration, the protocol pipelines such activity with the forwarding of RPRs in order to minimize the impact of matrix configuration overhead on the time required for restoration. While the response is making its way from node N1 to node N2, node N1 is configuring its matrix. In most cases, by the time the response reaches the origin node, all nodes along the path have already configured their matrices.

The Terminate indicator prevents "bad" instances of an RPR from circulating around the network for extended periods of time. The indicator is propagated all the way back to the originating node and prevents the originating node, and all other nodes along the path, from sending or forwarding other copies of the corresponding RPR instance.

Terminating RPR Packets are processed as follows. The RPR continues along the path until any one of the following four conditions is encountered:

1. Its HOP_COUNT reaches the maximum allowed (i.e. MAX_HOPS).
2. The request reaches a node that doesn't have enough bandwidth on any of its output links to satisfy the request.
3. The request reaches a node that had previously accepted a different instance of the same request from another neighbor.
4. The request reaches its ultimate destination: the target node, which is either the Destination node of the VP, or a proxy border node if the Source and Destination nodes are located in different zones.

Conditions 1, 2 and 3 cause a negative response to be sent back to the originating node, flowing along the path carried in the request, but in the reverse direction.

Further optimizations of the protocol can easily be envisioned by one of ordinary skill in the art, and are intended to be within the scope of this specification. For example, in one embodiment, a mechanism is defined to further reduce the amount of broadcast traffic generated for any given VP. In order to prevent an upstream neighbor from sending the same instance of an RPR every T milliseconds, a tandem node can immediately return a no-commit positive response to that neighbor, which prevents the neighbor from sending further copies of the instance. The response simply acknowledges the receipt of the request, and doesn't commit the sender to any of the requested resources. Preferably, however, the sender (of the positive response) periodically transmits the acknowledged request until a valid response is received from its downstream neighbor(s). This mechanism implements a piece-wise, or hop-by-hop, acknowledgment strategy that limits the scope of retransmitted packets to a region that gets progressively smaller as the request gets closer to its target node.

Optimizations

However, it is prudent to provide some optimizations for efficiently handling errors. Communication protocols often handle link errors by starting a timer after every transmission and, if a valid response isn't received within the timeout period, the message is retransmitted. If a response isn't received after a certain number of retransmission, the sender generates a local error and disables the connection. The timeout period is usually a configurable parameter, but in some cases the timeout period is computed dynamically, and continuously, by the two end points. The simplest form of this uses some multiple of the average round trip time as a timeout period, while others use complex mathematical formulas to determine this value. Depending on the distance between the two nodes, the speed of link that connects them, and the latency of the equipment along the path, the timeout period can range anywhere from millisecond to seconds.

The above strategy, is not the preferred method of handling link errors in the present invention. This is because the fast restoration times required dictates that 2-way, end-to-end communication be carried out in less than 50 ms. A drawback of the above-described solution is the time wasted while waiting for an acknowledgment to come back from the receiving node. A safe timeout period for a 2000 mile span, for instance, is over 35 ms, which doesn't leave enough time for a retransmission in case of an error.

This problem is addressed in one embodiment by taking advantage of the multiple communication channels, i.e. OC-48's that exist between nodes to:
1. Send N copies (N>=1) of the same request over as many channels, and
2. Re-send the request every T milliseconds (1 ms<T<10 ms) until a valid response is received from the destination node.

The protocol can further improve link efficiency by using small packets during the restoration procedure. Empirical testing in a simulated 40-node SONET network spanning the entire continental United States, showed that an N of 2 and a T of 15 ms provide a good balance between bandwidth utilization and path restorability. Other values can be used, of course, to improve bandwidth utilization or path restorability to the desired level.

Figure 14:
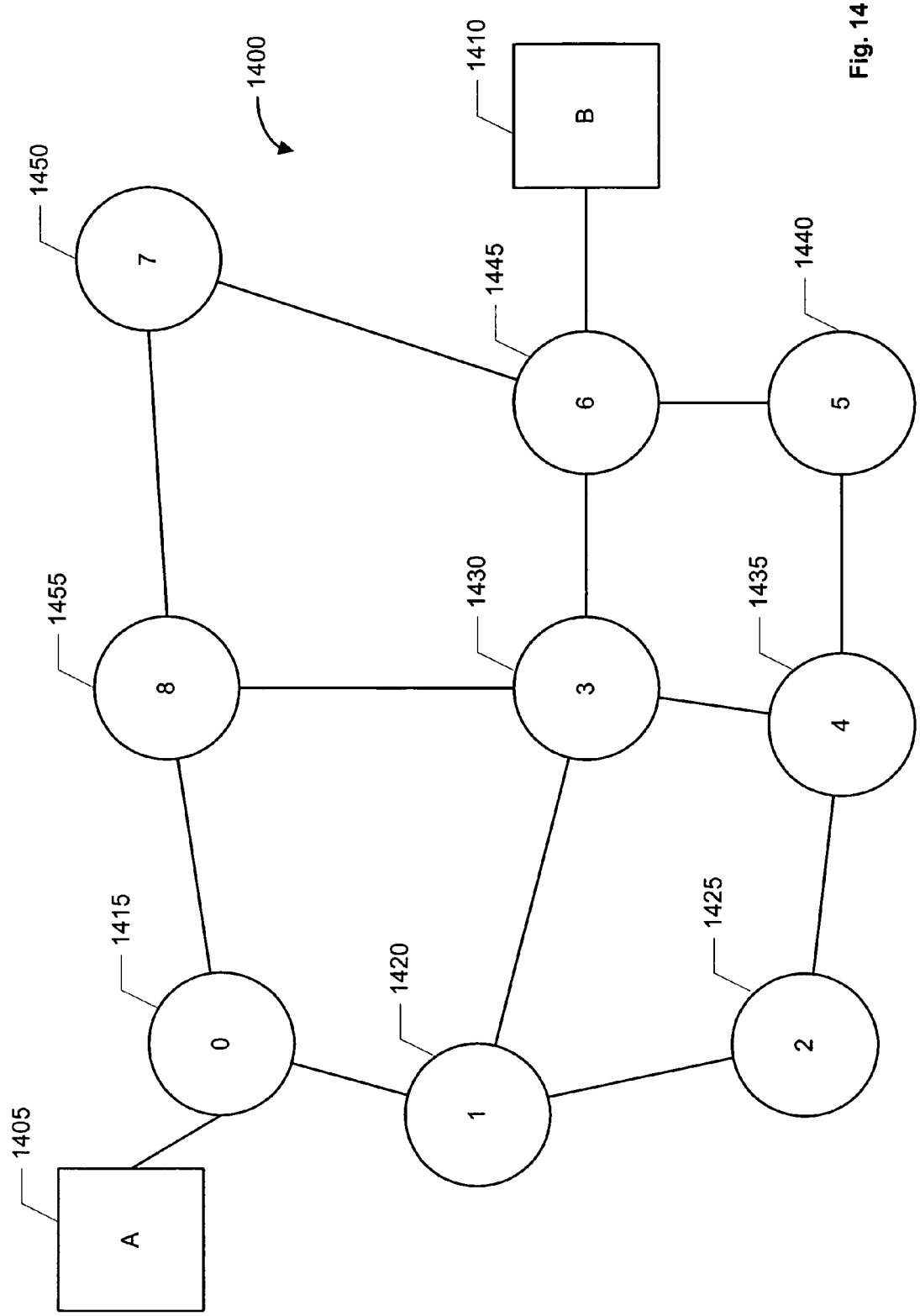
FIG. 14 is a block diagram illustrating an exemplary network.

FIG. 14 illustrates an exemplary network 1400. Network 1400 includes a pair of computers (computers 1405 and 1410) and a number of nodes (nodes 1415–1455). In the protocol, the nodes also have a node ID which is indicated inside circles depicting the node which range from zero to eight successively. The node IDs are assigned by the network provider. Node 1415 (node ID 0) is referred to herein as a source node, and node 1445 (node ID 6) is referred to herein as a destination node for a VP 0 (not shown). As previously noted, this adheres to the protocol's convention of having the node with the lower ID be the source node for the virtual path and the node with the higher node ID be the destination node for the VP.

Network 1400 is flat, meaning that all nodes belong to the same zone, zone 0 or the backbone zone. This also implies that Node IDs and Node Addresses are one and the same, and that the upper three bits of the Node ID (address) are always zeroes using the aforementioned node ID configuration. Tables 8A, 8B and 8C show link information for network 1400. Source nodes are listed in the first column, and the destination nodes are listed in the first row of Tables 8A, 8B and 8C. The second row of Table 8A lists the link ID. The second row of Table 8B lists the available bandwidth over the corresponding link. The second row of Table 8C lists distance associated with each of the links. In this example, no other metrics (e.g., QoS) are used in provisioning the VPs listed subsequently.

TABLE 8A

Link IDs for network 1400.

|   | 0 | 1 | 2 | 3 | 4 | 5 | 6 | 7 | 8 |
|---|---|---|---|---|---|---|---|---|---|
| 0 | * | 0 | — | — | — | — | — | — | 1 |
| 1 | 0 | * | 2 | 3 | — | — | — | — | — |
| 2 | — | 2 | * | — | 4 | — | — | — | — |
| 3 | — | 3 | — | * | 5 | — | 6 | — | 7 |
| 4 | — | — | 4 | 5 | * | 8 | — | — | — |
| 5 | — | — | — | — | 8 | * | 9 | — | — |
| 6 | — | — | — | 6 | — | 9 | * | 10 | — |
| 7 | — | — | — | — | — | — | 10 | * | 11 |
| 8 | 1 | — | — | 7 | — | — | — | 11 | * |

TABLE 8B

Link bandwidth for network 1400.

|   | 0 | 1 | 2 | 3 | 4 | 5 | 6 | 7 | 8 |
|---|---|---|---|---|---|---|---|---|---|
| 0 | * | 18 | — | — | — | — | — | — | 19 |
| 1 | 18 | * | 12 | 17 | — | — | — | — | — |
| 2 | — | 12 | * | — | 13 | — | — | — | — |
| 3 | — | 17 | — | * | 16 | — | 22 | — | 10 |
| 4 | — | — | 13 | 16 | * | 14 | — | — | — |
| 5 | — | — | — | — | 14 | * | 6 | — | — |
| 6 | — | — | — | 22 | — | 6 | * | 39 | — |
| 7 | — | — | — | — | — | — | 39 | * | 15 |
| 8 | 19 | — | — | 10 | — | — | — | 15 | * |

TABLE 8C

Link distances for network 1400.

|   | 0 | 1 | 2 | 3 | 4 | 5 | 6 | 7 | 8 |
|---|---|---|---|---|---|---|---|---|---|
| 0 | * | 10 | — | — | — | — | — | — | 8 |
| 1 | 10 | * | 6 | 14 | — | — | — | — | — |
| 2 | — | 6 | * | — | 11 | — | — | — | — |
| 3 | — | 14 | — | * | 7 | — | 8 | — | 15 |
| 4 | — | — | 11 | 7 | * | 13 | — | — | — |
| 5 | — | — | — | — | 13 | * | 9 | — | — |
| 6 | — | — | — | 8 | — | 9 | * | 20 | — |
| 7 | — | — | — | — | — | — | 20 | * | 19 |
| 8 | 8 | — | — | 15 | — | — | — | 19 | * |

Table 9A shows a list of exemplary configured VPs, and Table 9B shows the path selected for each VP by a shortest-path algorithm according to the present invention. The algorithm allows a number of metrics, e.g. distance, cost, delay, and the like to be considered during the path selection process, which makes possible the routing of VPs based on user preference. Here, the QOS metric is used to determine which VP has priority.

TABLE 9A

Configured VPs.

| VP ID | Source Node | Destination Node | Bandwidth | QoS |
|---|---|---|---|---|
| 0 | 0 | 6 | 1 | 3 |
| 1 | 0 | 5 | 2 | 0 |
| 2 | 1 | 7 | 1 | 1 |
| 3 | 4 | 6 | 2 | 2 |
| 4 | 3 | 5 | 1 | 3 |

TABLE 9B

Initial routes.

| VP ID | Path (Numbers represent node IDs) |
|---|---|
| 0 | 0→1→3→6 |
| 1 | 0→1→3→4→5 |
| 2 | 1→3→6→7 |
| 3 | 4→3→6 |
| 4 | 3→4→5 |

Path Selection

Paths are computed using what is referred to herein as a QoS-based shortest-path first (QSPF) technique. This may be done, for example, during the provisioning or the restoration of VPs. The path selection process relies on configured metrics and an up-to-date view of network topology to find the shortest paths for configured VPs. The topology database stored by each node contains information about all available network nodes, their links, and other metrics, such as the links' available capacity. Node IDs may be assigned by the user, for example, and should be globally unique. This gives the user control over the master/slave relationship between nodes. Duplicate IDs are detected by the network during adjacency establishment. All nodes found with a duplicate ID are preferably disabled by the protocol, and an appropriate alarm is generated to notify the network operations center of the problem so that appropriate action can be taken.

In the example of a QSPF technique described herein, the following variables are employed:

1. Ready—A queue that holds a list of nodes, or vertices, that need to be processed.
2. Database—The link state database that holds the topology information for the network, which is acquired automatically by the node using the Hello protocol. Preferably, this is a pruned copy of the topology database generated by the computing node, which removes all vertices and/or links that do not meet the specified requirements of the path to be configured.
3. Neighbors [A]—An array of "A" neighbors. Each entry contains a pointer to a neighbor data structure (as previously described).
4. Path [N][H]—A data storage structure, for example, a two dimensional array. The array, in this example, is N rows by H columns, where N is the number of nodes in the network (or zone, as previously discussed) and H is, for example, the maximum hop count (i.e., MAX_HOPS). Position (n, h) of the array contains a pointer to a data structure such as the following, where R is the root node (i.e., the node computing the new path). The structure includes a Cost entry, a NextHop entry, and a PrevHop entry, where Cost is the cost of the path from R to n, NextHop identifies the next node along the path from R to n, and PrevHop identifies the previous node along the path from n to R.

Two of the many embodiments of this method are now described. The first of these two methods allows for the determination of a path from the root node to another node using criteria such as a minimum number of hops or a path between the root node and the other node having the lowest cost based on connectivity information stored by the method in a path table. For this purpose, cost is discussed in terms of quality of service, and so can subsume physical distance, availability, cost of service, and other such characteristics. Another embodiment provides only the cost associated with the minimum cost path for each destination node reachable from the root node, again based on connectivity information stored in a path table or vector. This embodiment is useful for quickly determining the minimum cost possible between the root node and another node, and may be used in determining if any path exists with an acceptably low cost, for example. The first of these two approaches proceeds as follows (once again, R is the root node, i.e. the one computing the path(s)):

```
For each node n known to R:
    If (n neighbor R):
        Path [n][1].Cost = Neighbors[n].LinkCost
        Path [n][1].NextNode = n
        Path [n][1].PrevNode = R
        Place n in Ready
    Else:
        Path [n][1].Cost = MAX_COST
        Path [n][1].NextNode = NULL_NODE
        Path [n][1].PrevNode = NULL_NODE
For ( h = 2 through H):
    If (Ready != empty):
        For each node k, where k = 0 to N:
            Path[k][h].Cost = Path[k][h-1].Cost
            Path[k][h].NextNode = Path[k][h-1].NextNode
            Path[k][h].PrevNode = Path[k][h-1].PrevNode
        For each node n already in Ready (not including nodes added this iteration):
            For each neighbor m of n (as listed in n's LSA):
                If((Path[n][h-1].Cost + LinkCost (n-m)) < Path[m][h].Cost):
                    Path[m][h].Cost = Path[n][h-1].Cost + LinkCost (n-m)
                    Path[m][h].NextNode = Path[n][h-1].NextNode
```

-continued

```
                Path[m][h].PrevNode = n
                Place m in Ready
                        (processed on next iteration of outermost for-loop)
        Else:
                Go to DONE
DONE:
    LastHop = h
```

Figure 15A:
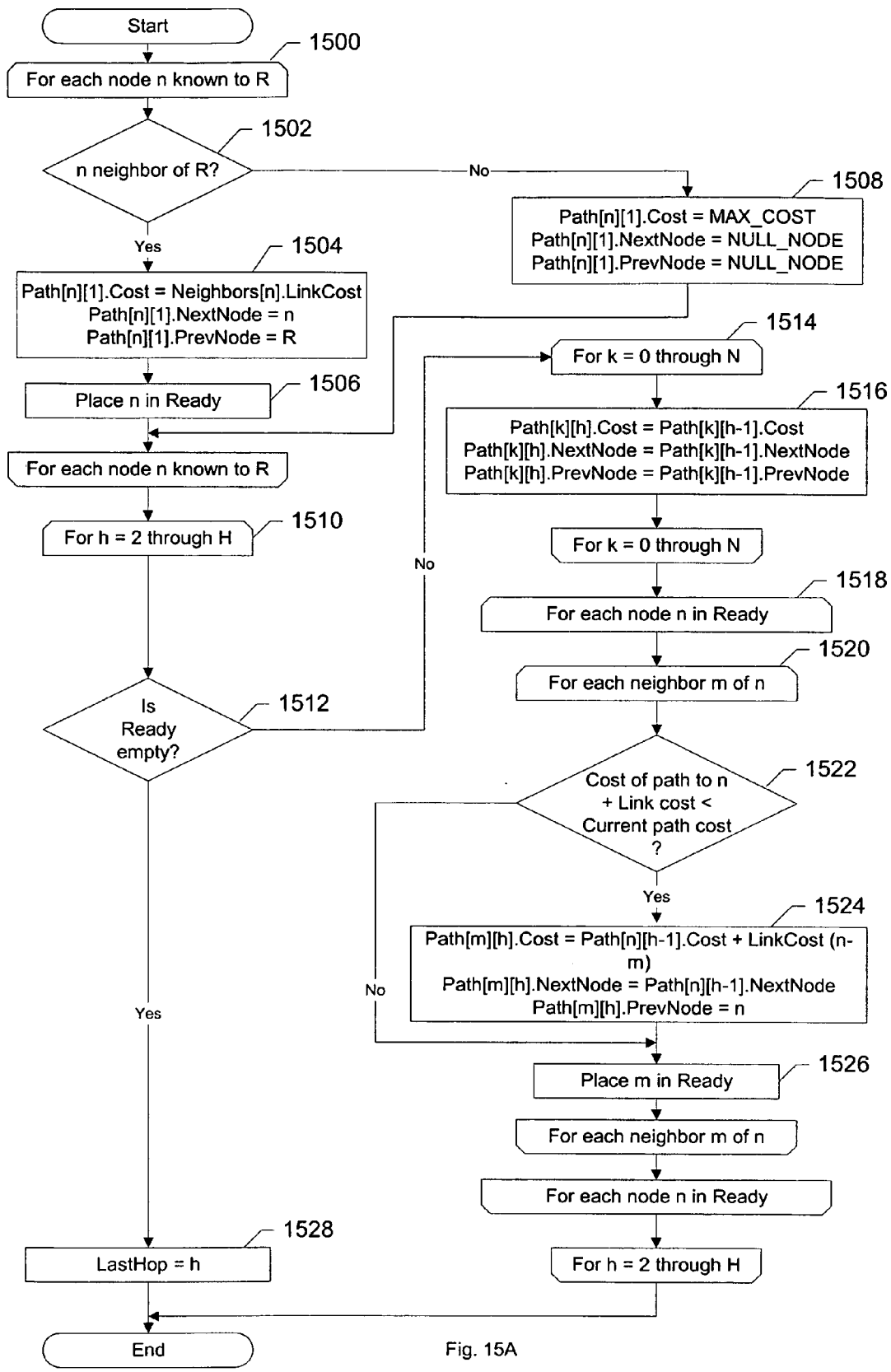
FIG. 15A is a flow diagram illustrating the actions performed in calculating the shortest path between nodes based on Quality of Service (QoS) according to one embodiment of the present invention.

FIG. 15A illustrates a flow diagram of the above QSPF technique. The process begins at step 1500 by starting with the first column of the path table. The process initializes the first column for each node known to the root node. Thus, the root node first determines if the current node is a neighbor (step 1502). If the node is a neighbor, several variables are set (step 1504). This includes setting the cost entry for the current neighbor to the cost of the link between the root node and the neighbor, setting the next node entry to identify the neighbor, and the previous node entry to identify the root node. The identifier for the neighboring node is then placed in the Ready queue (step 1506). If node n is not a neighbor of the root node, the aforementioned variables are set to indicate that such is the case (step 1508). This includes setting the cost entry for the current neighbor to a default value (here, a maximum cost (MAX_COST), although another value could be employed, with appropriate changes to subsequent tests of this entry), and also setting both the next node and previous node entries to a default value (e.g., a NULL_NODE identifier). In either case, the root node continues through the list of possible neighbor nodes.

The root node then goes on to fill other columns of the array (step 1510) until the Ready queue, which holds a list of nodes waiting to be processed, is empty (step 1512). Assuming that nodes remain to be processed (step 1512), entries of the column preceding the current column are copied into entries of the current column (steps 1514 and 1516). It will be noted that this step could simply be performed for all columns (including or not including the first column) in a separate loop, in which costs would be initialized to MAX_COST and next/previous node entries would be initialized to NULL_NODE. The next node in the Ready queue is then selected (step 1518). It is noted that only nodes in the Ready queue at the beginning of the current iteration of the outer-most loop illustrated in FIG. 15A are processed in the current iteration. Nodes added to the Ready queue during the current iteration are not processed until the following iteration.

For each neighbor of the node selected from the Ready queue (the selected node) (step 1520), the cost of the path from the root node to the selected node is added to the cost of the link between the selected node and its neighbor, and the result compared to the current minimum path cost (step 1522). If the result is smaller than the current minimum path cost (step 1522), the current path cost is set to the result, the next node entry is set to the selected node's next node value, and the previous node is set to identify the selected node. An identifier identifying the neighbor is then placed on the Ready queue (step 1526). The process loops if neighbors of the selected node have not been processed (step 1520). If more nodes await processing in the Ready queue, they are processed in order (step 1512), but if all nodes have been processed, the process jumps out of the loop and saves the last value of h in LastHop (step 1528). LastHop allows the minimum-cost path retrieval procedure to process only the columns necessary to determining the minimum-cost path. The QSPF process is then at an end.

The path table now holds information that allows the determination of both the lowest-cost path from the root node to a given destination node, and the path from the root node to a given destination node having the minimum number of hops. It will be noted that the process now described assumes that the path table is ordered with columns corresponding to the number of hops from the root (source) node, although it will be apparent to one of ordinary skill in the art that a different ordering could be employed with minor modifications to the process. To determine the minimum-hop path from the root node (source node) to another node (destination node) using the information in the path table, row n of the array is searched until an entry with a cost not equal to MAX_COST is found. The following procedure may be employed to achieve this end:

```
CurrRow = DestinationNode
CurrColumn = 1
NumHops = 1
While (Path[CurrRow][CurrColumn].Cost == MAX_COST)
        NumHops = NumHops + 1
        CurrColumn = CurrColumn + 1
NewPath[CurrColumn + 1] = DestinationNode
While (Path[CurrRow][CurrColumn].PrevNode != R)
        NewPath[CurrColumn] = Path[CurrRow][CurrColumn].PrevNode
        CurrRow = Path[CurrRow][CurrColumn].PrevNode
        CurrColumn = CurrColumn - 1
NewPath[CurrColumn] = R
``` wherein NewPath is, for example, a one-dimensional array storing the path from the root node (R, as before) and the destination node (DestinationNode) and is large enough to store the maximum-length path (i.e., has MAX_HOPS locations).

Figure 15B:
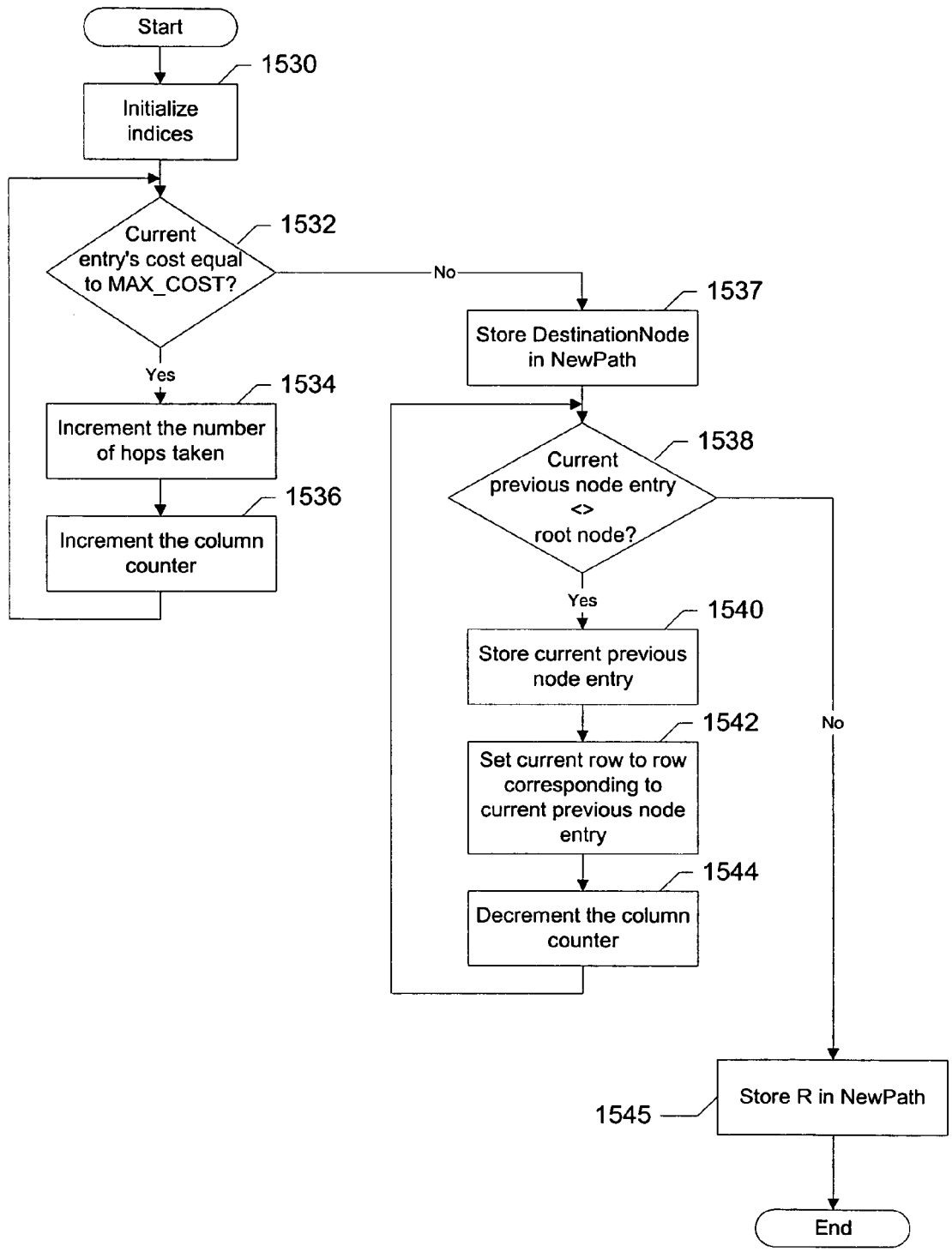
FIG. 15B is a flow diagram illustrating the actions performed in retrieving a minimum-hop path according to one embodiment of the present invention.

FIG. 15B illustrates a flow diagram for the above path retrieval technique. The method begins with the setting of the indices (step 1530). The number of hops (NumHops) is initialized to one, the current column (CurrColumn) is set to one, and the row (CurrRow) corresponding to destination node is selected. These settings indicate that there is at least one hop between the root node and any other node, and that the row corresponding to the destination node is to be processed. Next, the number of hops between the root node and the destination node is determined. If the current path table entry (as designated by CurrRow and CurrColumn) has a cost entry that's less than MAX_COST (step 1532), the process increments the number of hops taken (step 1534) and the current column of the path table being examined (step 1536). This continues until the current path table entry has a cost entry that's less than MAX_COST (step 1532), indicating that the destination node can be reached from the root node in the given number of hops, as well as the cost of that path.

The path is stored in NewPath by traversing the path from the destination node to the root node using the path table's previous node entries. The path from the destination node is thus traversed in the reverse order from that taken in generating the table. First, the destination node is placed in NewPath at location (CurrColumn+1) (step 1537). Next, the previous node entry of the current path table entry is examined to determine if the root node has been reached (step 1538). If the root node has not yet been reached, the previous node entry is placed in NewPath (step 1540). The current row is then set to the row corresponding to the previous node entry in the current path table entry (step 1542), and the column counter decremented (step 1544). This continues until the root node is reached (step 1538). The root node is then the root node is placed in NewPath (step 1545). The process is then complete, whereupon NewPath contains the minimum-hop path between the root node and the destination node.

To determine the minimum-cost path from the root node (source node) to another node (destination node), regardless of the hop-count, the entries of the row corresponding to the destination node are scanned, and the entry with the lowest cost selected. This may be done, for example, by employing the following procedure:

```
CurrRow = DestinationNode
CurrNumHops = 1
MinCost = MAX_COST
For CurrColumn = 1 to LastHop
    if (Path[CurrRow][CurrColumn].Cost < MinCost)
        MinCostNumHops = CurrNumHops
        MinCostColumn = CurrColumn
    CurrNumHops = CurrNumHops + 1
CurrColumn = MinCostColumn
NewPath[CurrColumn + 1] = DestinationNode
While (Path[CurrRow][CurrColumn].PrevNode != R)
    NewPath[CurrColumn] = Path[CurrRow][CurrColumn].PrevNode
    CurrRow = Path[CurrRow][CurrColumn].PrevNode
    CurrColumn = CurrColumn - 1
NewPath[CurrColumn] = R
``` where NewPath is, for example, a one-dimensional array storing the path from the root node (R, as before) and the destination node (DestinationNode) and is large enough to store the maximum-length path (i.e., has MAX_HOPS locations).

Figure 15C:
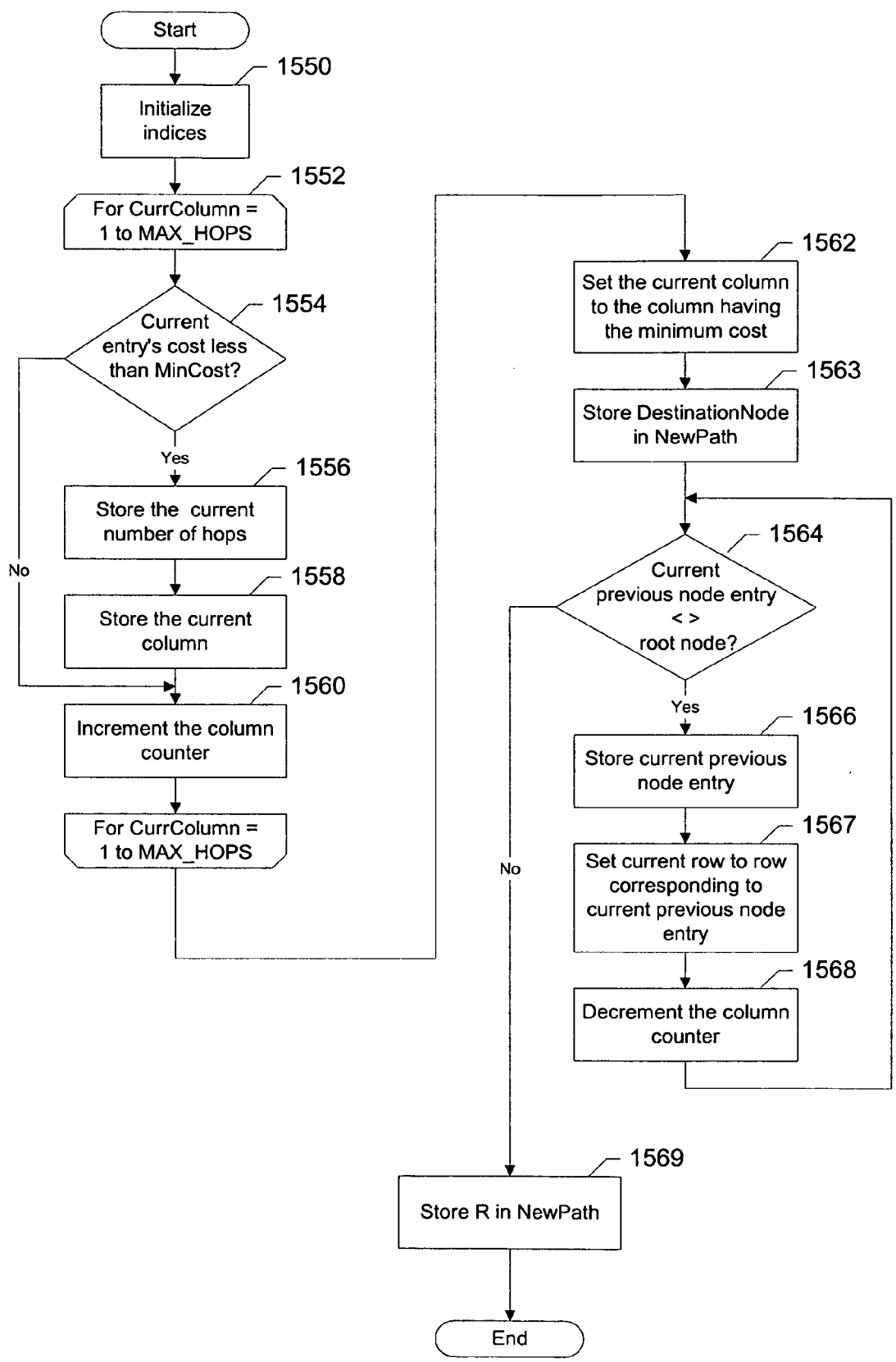
FIG. 15C is a flow diagram illustrating the actions performed in retrieving a minimum-cost path according to one embodiment of the present invention.

FIG. 15C illustrates a flow diagram for the above path retrieval technique. The method begins with the setting of the indices (step 1550). The number of hops (NumHops) is initialized to one, the row (CurrRow) corresponding to destination node is selected, and the minimum cost (MinCost) is set to MAX_COST. These settings indicate that there is at least one hop between the root node and any other node, and that the row corresponding to the destination node is to be processed. Next, the minimum cost path between the root node and the destination node is ascertained from the path table. For each column of the path table (step 1552), if the current path table entry (as designated by CurrRow and CurrColumn) has a cost entry that's less than the current minimum path cost (step 1554), the process stores the number of hops taken (step 1556) and the current column of the path table being examined (step 1558). The current column is then incremented (step 1560). This continues until all the path table's columns (i.e., paths up to LastHop in length) have been examined (step 1552). This identifies the lowest cost path between the root and destination nodes, and, in fact, that the destination node can be reached from the root node.

The path is stored in NewPath by traversing the path from the destination node to the root node using the path table's previous node entries. The path from the destination node is thus traversed in the reverse order from that taken in generating the table. First, the current column is set to the column having the lowest cost (step 1562) and the destination node is placed in NewPath at location (CurrColumn+1) (step 1563). Next, the previous node entry of the current path table entry is examined to determine if the root node has been reached (step 1564). If the root node has not yet been reached, the previous node entry is placed in NewPath (step 1566). The current row is then set to the row corresponding to the previous node entry in the current path table entry (step 1567), and the column counter decremented (step 1568). This continues until the root node is reached (step 1564). The root node is then the root node is placed in NewPath (step 1569). The process is then complete, whereupon NewPath contains the minimum-cost path between the root node and the destination node. In this scenario, MinCostNumHops contains the number of hops in the minimum-cost path.

Several alternative ways of implementing the method of the present invention will be apparent to one of ordinary skill in the art, and are intended to come within the scope of the claims appended hereto. For example, the minimum number of hops for the minimum-cost path may be determined at the time the path is stored. Additionally, the method could be modified to continue copying one column to the next, whether or not the Ready queue was empty, and simply begin storing the path using the last column of the path table, as the last column would contain an entry corresponding to the minimum cost path to the destination node. Other modifications and alterations will be apparent to one of ordinary skill in the art, and are also intended to come within the scope of the claims appended hereto. Moreover, it will be noted that the information held in each entry in the path table includes a "next node" entry. This indicates the "gateway" node for the path (i.e., the node nearest the root node through which the minimum hop/lowest cost path must pass).

The second embodiment, based on the preceding embodiment, generates a path table that stores the cost associated with the minimum cost path from the root node to a given destination node. As noted, this embodiment may be used in determining if any path exists with an acceptably low cost, for example. In this embodiment, the path table (Path) may be an nx1 (or 1xn) array (or vector), for example. The second embodiment proceeds as follows:

```
For each node n known to R:
    If (n neighbor R):
        Path[n].Cost = Neighbors[n].LinkCost
        Place n in Ready
    Else:
        Path[n].Cost = MAX_COST
For ( h = 2 through MAX_HOPS):
    If (Ready != empty):
```

-continued

```
For each node n already in Ready (not including nodes added this iteration):
    For each neighbor m of n (as listed in n's LSA):
        If((Path[n].Cost + LinkCost (n–m)) < Path[m].Cost):
            Path[m].Cost = Path[n].Cost + LinkCost (n–m)
            Place m in Ready
                (processed on next iteration of outermost for-loop)
```

Done Creating Path Table

Figure 15D:
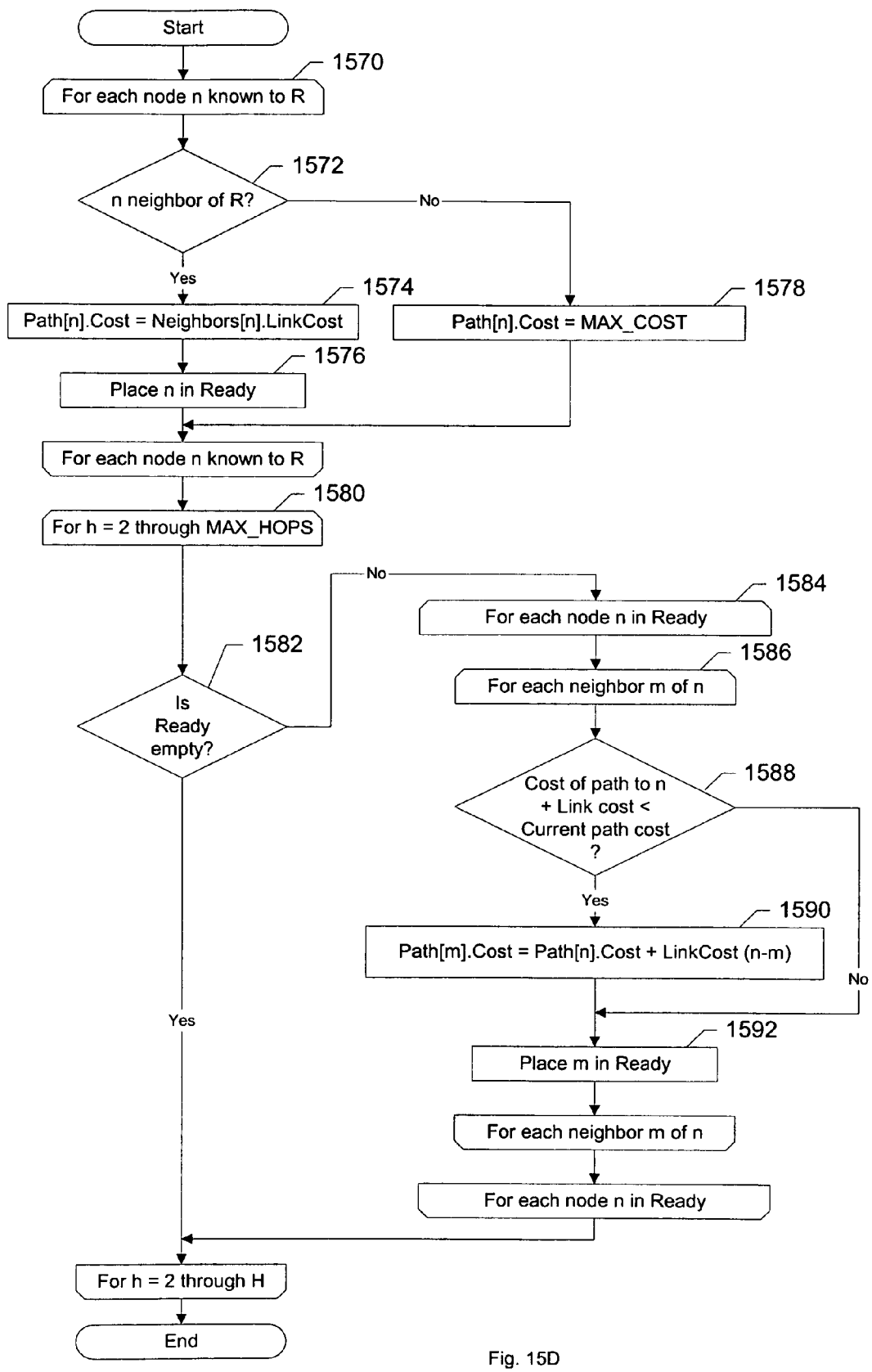
FIG. 15D is a flow diagram illustrating the actions performed in calculating the shortest path between nodes based on Quality of Service (QoS) according to another embodiment of the present invention.

FIG. 15D illustrates a flow diagram of the above technique. The process begins at step 1570 by initializing the array for each node n known to the root node. Thus, the root node first determines if the current node is a neighbor (step 1572). If the node is a neighbor of the root node, the cost entry in the row corresponding to the given node is set to the cost of the link between the root node and the neighbor (step 1574). The identifier for the neighboring node is placed in the Ready queue (step 1506). If the given node is not a neighbor of the root node, the aforementioned variables are set to indicate that such is the case (step 1508). This includes setting the cost entry for the current neighbor to MAX_COST. In either case, the root node continues through the list of possible neighbor nodes.

The root node then goes on to complete the path table (step 1580) until the Ready queue, which holds a list of nodes waiting to be processed, is empty (step 1582). Assuming that nodes remain to be processed (step 1582), the next node in the Ready queue is selected (step 1584). It is noted that only nodes in the Ready queue at the beginning of the current iteration of the outer-most loop illustrated in FIG. 15D are processed in the current iteration. Nodes added to the Ready queue during the current iteration are not processed until the following iteration.

For each neighbor of the node selected from the Ready queue (the selected node) (step 1586), the cost of the path from the root node to the selected node is added to the cost of the link between the selected node and its neighbor, and the result compared to the current minimum path cost (step 1588). If the result is smaller than the current minimum path cost (step 1588), the current path cost is set to the result (step 1590) and an identifier identifying the neighbor is placed on the Ready queue (step 1592). The process loops if neighbors of the selected node have not been processed (step 1586). If more nodes await processing in the Ready queue, they are processed in order (step 1584), but if all nodes have been processed, the process is at an end.

Each entry in Path now contains the cost of minimum-cost path from the root node to each destination node. Because this embodiment neither stores nor provides any information regarding the specific nodes in any of the minimum-cost paths, no procedures for retrieving such paths from a path table thus created need be provided.

Format and Usage of Protocol Messages

Protocol messages (or packets) preferably begin with a standard header to facilitate their processing. Such a header preferably contains the information necessary to determine the type, origin, destination, and identity of the packet. Normally, the header is then followed by some sort of command-specific data (e.g., zero or more bytes of information).

Such a header may include, for example, a request response indicator (RRI), a negative response indicator (NRI), a terminate/commit path indicator (TPI), a flush path indicator (FPI), a command field, a sequence number, an origin node ID (1670) and a target node ID. A description of these fields is provided below in Table 10. It will be noted that although the terms "origin" and "target" are used in describing header 1600, their counterparts (source and destination, respectively) can be used in their stead. Preferably, packets sent using a protocol according to the present invention employ a header layout such as that shown as header 1600. The header is then followed by zero or more bytes of command specific data.

TABLE 10

The layout of exemplary header 1600.

| | |
|---|---|
| R-bit | This bit indicates whether the packet is a request (0) or a response (1). The bit also known as the request/response indicator or RRI for short. |
| N-bit | This bit, which is only valid in response packets (RRI = 1), indicates whether response is positive (0) or negative (1). The bit is also known as the Negative Response Indicator or NRI. |
| T/C Bit | In a negative response (NRI = 1), this bit is called a Terminate Path Indicator or TPI. When set, TPI indicates that the path along the receiving link should be terminated and never used again for this or any other instance of the corresponding request. The response also releases all bandwidth allocated for the request along all paths, and makes that bandwidth available for use by other requests. A negative response that has a "1" in its T-Bit is called a Terminate response. Conversely, a negative response with a "0" in its T-Bit is called a no-Terminate response. In a positive response (NRI = 0), this bit indicates whether the specified path has been committed to by all nodes (1) or not (0). The purpose of a positive response that has a "0" in its C-Bit is to simply acknowledge the receipt of a particular request and to prevent the upstream neighbor from sending further copies of the request. Such a response is called a no-Commit response. |
| F-bit | Flush Indicator. When set, this bit causes the resources allocated on the input link for the corresponding request to be freed, even if the received sequence number doesn't match the last one sent. However, the sequence number has to be valid, i.e., the sequence number has to fall between FirstReceived and LastSent, inclusive. This bit also prevents the node from sending other copies of the failed request over the input link. This bit is reserved and must be set to "0" in all positive responses (NRI = 0). |
| Command | This 4-bit field indicates the type of packet being carried with the header. |
| SequenceNumber | A node and VP unique number that, along with the node and VP IDs, helps identify specific instances of a particular command. |
| Origin | The node ID of the node that originated this packet. |
| Target | The node ID of the node that this packet is destined for. |

The protocol can be configured to use a number of different commands. For example, seven commands may be used with room in the header for 9 more. Table 11 lists those commands and provides a brief description of each, with detailed description of the individual commands following.

TABLE 11

Exemplary protocol commands.

| Command Name | Command Code | Description |
|---|---|---|
| INIT | 0 | Initialize Adjacency |
| HELLO | 1 | Used to implement the Hello protocol (see Section 3 for more details). |
| RESTORE_PATH | 2 | Restore Virtual Path or VP |
| DELETE_PATH | 3 | Delete and existing Virtual Path |
| TEST_PATH | 4 | Test the specified Virtual Path |
| LINK_DOWN | 5 | Used by slave nodes to inform their master(s) of local link failures |
| CONFIGURE | 6 | Used by master notes to configure slave nodes. |

The Initialization Packet

An initialization packet causes a START event to be sent to the Hello State Machine of the receiving node, and includes a node ID field, a link cost field, one or more QoS capacity fields (e.g., a QoS3 capacity (Q3C) field and a QoSn capacity (QnC) field), a Hello interval field and a time-out interval field.

The initialization (or NIT) packet is used by adjacent nodes to initialize and exchange adjacency parameters. The packet contains parameters that identify the neighbor, its link bandwidth (both total and available), and its configured Hello protocol parameters. The NIT packet is normally the first protocol packet exchanged by adjacent nodes. As noted previously, the successful receipt and processing of the INIT packet causes a START event to be sent to the Hello State machine. The field definitions appear in Table 12.

TABLE 12

Field definitions for an initialization packet.

| | |
|---|---|
| NodeID | Node ID of the sending node. |
| LinkCost | Cost of the link between the two neighbors. This may represent distance, delay or any other additive metric. |
| QoS3Capacity | Link bandwidth that has been reserved for QoS3 connection. |
| QoSnCapacity | Link bandwidth that is available for use by all QoS levels (0–3). |
| HelloInterval | The number of seconds between Hello packets. A zero in this field indicates that this parameter hasn't been configured on the sending node and that the neighbor should use its own configured interval. If both nodes send a zero in this field then the default value should be used. |
| HelloDeadInterval | The number of seconds the sending node will wait before declaring a silent neighbor down. A zero in this field indicates that this parameter hasn't been configured on the sending node and that the neighbor should use its own configured value. If both nodes send a zero in this field then the default value should be used. |

The Hello Packet

A Hello packet includes a node ID field, an LS count field, an advertising node field, a checksum field, an LSID field, a HOP_COUNT field, a neighbor count field, a neighbor node ID field, a link ID field, a link cost field, a Q3C field, and a QnC field. Hello packets are sent periodically by nodes in order to maintain neighbor relationships, and to acquire and propagate topology information throughout the network. The interval between Hello packets is agreed upon during adjacency initialization. Link state information is included in the packet in several situations, such as when the database at the sending nodes changes, either due to provisioning activity, port failure, or recent updates received from one or more originating nodes. Preferably, only modified LS entries are included in the advertisement. A null Hello packet, also sent periodically, is one that has a zero in its LSCount field and contains no LSAs. Furthermore, it should be noted that a QoSn VP is allowed to use any bandwidth reserved for QoS levels 0 through n. Table 13 describes the fields that appear first in the Hello packet. These fields appear only once.

TABLE 13

Field definitions for the first two fields of a Hello packet.

| | |
|---|---|
| NodeID | Node ID of the node that sent this packet, i.e. our neighbor |
| LSCount | Number of link state advertisements contained in this packet |

Table 14 describes information carried for each LSA and so is repeated LSCount times:

TABLE 14

Field definitions for information carried for each LSA.

| | |
|---|---|
| AdvertisingNode | The node that originated this link state entry. |
| Checksum | A checksum of the LSAs content, excluding fields that node's other than the originating node can alter. |
| LSID | Instance ID. This field is set to FIRST_LSID on the first instance of the LSA, and is incremented for every subsequent instance. |
| Hop_Count | This field is set to 0 by the originating node and is incremented at every hop of the flooding procedure. An LSA with a Hop_Count of MAX_HOPS is not propagated. LSAs with Hop_Counts equal to or greater than MAX_HOPS are silently discarded. |
| NeighborCount | Number of neighbors known to the originating node. This is also the number of neighbor entries contained in this advertisement. |

Table 15 describes information carried for each neighbor and so is repeated NeighborCount times:

TABLE 15

Field definitions for information carried for each neighbor.

| | |
|---|---|
| Neighbor | Node ID of the neighbor being described. |
| LinkCost | Cost metric for this link. This could represent distance, delay or any other metric. |
| QoS3Capacity | Link bandwidth reserved for the exclusive use of QoS3 connections. |
| QoSnCapacity | Link bandwidth available for use by all QoS levels (0–3). |

The GET_LSA Packet

A GET_LSA packet has its first byte set to zero, and includes an LSA count that indicates the number of LSAs being sought and a node ID list that reflects one or more of the node IDs for which an LSA is being sought. The node ID list includes node IDs. The GET_LSA response contains a mask that contains a "1" in each position for which the target node possesses an LSA. The low-order bit corresponds to the first node ID specified in the request, while the highest-order bit corresponds to the last possible node ID. The response is then followed by one or more Hello messages that contain the actual LSAs requested.

Table 16 provides the definitions for the fields shown in FIG. 19.

TABLE 16

Field definitions for a GET_LSA packet.

| | |
|---|---|
| Count | The number of node ID's contained in the packet. |
| NodeID0– NodeIDn | The node IDs for which the sender is seeking an LSA. Unused fields need not be included in the packet and should be ignored by the receiver. |

The Restore Path Packet

An RPR packet includes a virtual path identifier (VPID) field, a checksum field, a path length field, a HOP_COUNT field, and an array of path lengths. The path field may be further subdivided into hop fields, which may number up to MAX_HOPS hop fields. The Restore Path packet is sent by source nodes (or proxy border nodes), to obtain an end-to-end path for a VP. The packet is usually sent during failure recovery procedures but can also be used for provisioning new VPs. The node sending the RPR is called the origin or source node. The node that terminates the request is called the target or destination node. A restore path instance is uniquely identified by its origin and target nodes, and VP ID. Multiple copies of the same restore-path instance are identified by the unique sequence number assigned to each of them. Only the sequence number need be unique across multiple copies of the same instance of a restore-path packet. Table 17 provides the appropriate field definitions.

TABLE 17

Field definitions for a Restore Path packet.

| | |
|---|---|
| VPID | The ID of the VP being restored. |
| Checksum | The checksum of the complete contents of the RPR, not including the header. The checksum is normally computed by a target node and verified by the origin node. Tandem nodes are not required to verify or update this field. |
| PathLength | Set to MAX_HOPS on all requests: contains the length of the path (in hops, between the origin and target nodes). |
| PathIndex | Requests: Points to the next available entry in Path [ ]. Origin node sets the PathIndex to 0, and nodes along the path store the link ID of the input link in Path[ ] at PathIndex. PathIndex is then incremented to point to the next available entry in Path [ ]/ Responses: Points to the entry in Path[ ] that corresponds to the link the packet was received on . . . |
| Path[ ] | An array of PathLength link IDs that represent the path between the origin and target nodes. |

The Create Path Packet

A CREATE_PATH (CP) packet includes a virtual path identifier (VPID) field, a checksum field, a path length field, a HOP_COUNT field, and an array of path lengths. The path field may be further subdivided into hop fields, which may number up to MAX_HOPS. The CP packet is sent by source nodes (or proxy border nodes), to obtain an end-to-end path for a VP. The node sending the CP is called the origin or source node. The node that terminates the request is called the target or destination node. A CP instance is uniquely identified by its origin and target nodes, and VP ID. Multiple copies of the same CP instance are identified by the unique sequence number assigned to each of them. Only the sequence number need be unique across multiple copies of the same instance of a restore-path packet. Table 18 provides the appropriate field definitions.

TABLE 18

Field definitions for a Create Path packet.

| | |
|---|---|
| VPID | The ID of the VP being provisioned. |
| Checksum | The checksum of the complete contents of the CP, not including the header. The checksum is normally computed by a target node and verified by the origin node. Tandem nodes are not required to verify or update this field. |
| PathLength | Set to MAX_HOPS on all requests: contains the length of the path (in hops, between the origin and target nodes). |
| PathIndex | Requests: Points to the next available entry in Path [ ]. Origin node sets PathIndex to 0, and nodes along the path store the link ID of the input link in Path[ ] at PathIndex. PathIndex is then incremented to point to the next available entry in Path [ ]/ Responses: Points to the entry in Path[ ] that corresponds to the link the packet was received on . . . |
| Path[ ] | An array of PathLength link IDs that represent the path between the origin and target nodes. |

The Delete Path Packet

The Delete Path packed is used to delete an existing path and releases all of its allocated link resources. This command can use the same packet format as the Restore Path packet. The origin node is responsible for initializing the Path [ ] PathLength, and Checksum fields to the packet, which should include the full path of the VP being deleted. The origin node also sets PathIndex to zero. Tandem nodes should release link resources allocated for the VP after they have received a valid response from the target node. The target node should set the PathIndex field to zero prior to computing the checksum of packet.

The TestPath Packet

The TestPath packet is used to test the integrity of an existing virtual path. This packet uses the same packet format as the RestorePath packet. The originating node is responsible for initializing the Path [ ], PathLength, and Checksum fields of the packet, which should include the full path of the span being tested. The originating node also sets PathIndex to zero. The target node should set the PathIndex field to zero prior to computing the checksum of packet. The TestPath packet may be configured to test functionality, or may test a path based on criteria chosen by the user, such as latency, error rate, and the like.

The Link-Down Packet

The Link-Down packet is used when master nodes are present in the network. This packet is used by slave nodes to inform the master node of link failures. This message is provided for instances in which the alarms associated with such failures (AIS and RDI) do not reach the master node.

While particular embodiments of the present invention have been shown and described, it will be obvious to those of ordinary skill in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims.

What is claimed is:

1. A method for finding a path in a network, wherein said network comprises a plurality of nodes and a plurality of links and each one of said plurality of nodes is coupled to at least one other of said plurality of nodes by at least one of said plurality of links, comprising:

generating at least one path cost data set, said path cost data set representing a path cost between a root node of said nodes and destination node of said nodes, wherein said path begins at said root node and ends at said destination node; and accessing said at least one path cost data set wherein
said generating and said accessing are performed in such a manner that a minimum-hop path and a minimum-cost path can be determined from said at least one path cost data set,
said minimum-hop path represents a path between said root node and said destination node having a minimum number of hops, and at least a requested bandwidth,
said minimum-cost path represents a path between said root node and said destination node having a minimum cost, and at least a requested bandwidth
said minimum cost comprises a cost of a bandwidth along at least a portion of said path.

2. The method of claim 1, further comprising:
storing said at least one path cost data set in a path storage area such that said at least one path cost data set can be accessed to determine said minimum-hop path and said minimum-cost path.

3. The method of claim 2, further comprising:
allocating said path storage area in a data structure that facilitates said access to determine said minimum-hop path and said minimum-cost path.

4. The method of claim 1, further comprising:
storing said at least one path cost data set in a data structure, wherein
said data structure is a two-dimensional array of entries arranged in a plurality of rows and a plurality of columns,
each one of said rows in said data structure corresponds to one of said plurality of nodes, and
each one of said columns in said data structure corresponds to a given hop count.

5. The method of claim 4, further comprising:
determining said minimum-hop path to said destination node by:
traversing a one of said rows corresponding to said destination node from a first column of said columns to a second column of said columns, and
storing path information representing said minimum-hop path while traversing said data structure from said second column to said first column, said second column being a first one of said columns encountered when traversing said one of said rows from said first column to said second column having non-default cost entry.

6. The method of claim 5, wherein said first column corresponds to said root node.

7. The method of claim 4, further comprising:
determining said minimum-cost path to said destination node by:
identifying a minimum-cost column of said columns, said minimum-cost column having a lowest cost entry of all of said columns in a one of said rows corresponding to said destination node, and
storing path information representing said minimum-cost path while traversing said data structure from said minimum-cost column to a first column of said columns.

8. The method of claim 7, wherein said first column corresponds to said root node.

9. A method of finding a path in a network comprising:
creating a path table, wherein:
said path table comprises a first number of rows and a second number of columns,
said network comprises a plurality of nodes and a plurality of links,
each one of said plurality of nodes is coupled to at least one other of said plurality of nodes by at least one of said plurality of links, and
said path begins at a root node of said plurality of nodes;
processing each row in a first column of said second number of columns, wherein said processing said each row in said first column of said second number of columns comprises:
for said each row in said first column of said second number of columns, wherein a selected node of said plurality of nodes corresponds to said row in said first column,
if said selected node is a neighbor of said root node,
storing a first link cost in a first cost entry, wherein said first link cost is a link cost of a first one of said plurality of links,
said first one of said plurality of links is between said root node and said selected node, and
said first cost entry is a cost entry of said row in said first column,
storing a root node identifier in a first previous node entry, wherein said root node identifier represents said root node and said first previous node entry is a previous node entry of said row in said first column, and
storing a node identifier representing said selected node in a storage area, else,
storing a maximum cost value in said first cost entry, and
storing a null value in said first previous node entry
said processing each row in said first column of said second number of columns resulting in said first column containing corresponding first connectivity information; and
processing each remaining column, wherein
said each remaining column is a one of said second number of columns other than said first column, and
said processing each remaining column resulting in said first column containing corresponding subsequent connectivity information.

10. The method of claim 9, wherein said processing said each remaining column comprises:
for said each remaining column,
if said storage area is not empty,
copying each row of a preceding column to a corresponding row of said remaining column, said preceding column being a one of said second number of columns other than said remaining column,
for each stored node identifier, said stored node identifier being stored in said storage area and corresponding to a current node of said plurality of nodes,
removing said stored node identifier from said storage area,
for each neighboring node, said neighboring node being a neighbor of said current node,
adding a neighboring link cost to a preceding path cost in order to yield an alternate path cost, wherein
said neighboring link cost is a link cost of a second one of said plurality of links, said second one of said plurality of links being between said current node and said neighboring node, and said preceding path cost is a cost value stored in a cost entry of a row of said preceding column, said row of said preceding column corresponding to said current node, if said alternate path cost is less than a cost value stored in a current cost entry, storing said alternate path cost in said current cost entry, said current cost entry being a cost entry of a row of said remaining column, said row of said remaining column corresponding to said neighboring node, storing a node identifier representing said current node in a previous node entry of said row of said remaining column, and storing a node identifier representing said neighboring node in said storage area.

11. The method of claim 10, further comprising:
identifying said root node, wherein said root node stores a topology database comprising:
   connectivity information regarding which ones of said plurality of nodes are coupled to which other ones of said plurality of nodes, and
   a link cost for each one of said plurality of links.

12. The method of claim 11, further comprising:
generating said topology database by:
   for each one of said plurality of nodes,
      identifying, at least one neighboring node that is a neighbor of said each one of said plurality of nodes and at least one neighboring link that couples said at least one neighboring node to said each one of said plurality of nodes, wherein said plurality of nodes includes said at least one neighboring node and said plurality of links includes said at least one neighboring link,
      determining a link cost for each one of said at least one neighboring link, and
      storing said link cost at said each one of said plurality of nodes; and
   distributing said connectivity information for each one of said plurality of nodes to other of said plurality of nodes.

13. The method of claim 12, wherein said link cost is a physical length of a corresponding one of said plurality of links.

14. The method of claim 12, wherein said link cost is a bandwidth of a corresponding one of said plurality of links.

15. The method of claim 10, wherein said first number is equal to a number of nodes in said plurality of nodes.

16. The method of claim 10, wherein each one of said second number of columns corresponds to a number of hops.

17. The method of claim 16, wherein said number of hops is equal to a maximum number of hops.

18. The method of claim 17, wherein said maximum number of hops is a maximum number of hops possible when using said method.

19. The method of claim 17, wherein said maximum number of hops is a maximum number of hops selected by a user.

20. The method of claim 10, wherein said each neighboring node is one of said plurality of nodes that is a neighbor of said current node.

21. The method of claim 10, wherein said stored node identifier is already stored in said storage area at a time when processing of said remaining column is begun.

22. The method of claim 10, wherein said preceding path cost is a cost of a path between said root node and said current node.

23. The method of claim 10, wherein said storage area is a queue.

24. The method of claim 10, further comprising:
selecting a destination node from said plurality of nodes, said destination node being a one of said plurality of nodes other than said root node; and
determining a minimum number of hops between said root node and said destination node by
   setting said minimum number of hops to one, and
   for each one of said second number of columns, incrementing said minimum number of hops by one if a cost entry in a row of said one of said second number of columns is equal to said maximum cost value, said row of said one of said second number of columns corresponding to said destination node.

25. The method of claim 10, further comprising:
selecting a destination node from said plurality of nodes, said destination node being a one of said plurality of nodes other than said root node; and
determining a minimum cost of said path, said path being between said root node and said destination node, by searching a one of said first number of rows corresponding to said destination node for a one of said second number of columns having a smallest cost entry of cost entries of said second number of columns in said one of said first number of rows.

26. The method of claim 10, wherein each one of said first number of rows corresponds to a one of said plurality of nodes.

27. The method of claim 10, wherein each one of said second number of columns corresponds to a corresponding number of hops from said root node and said second number of columns is arranged in a monotonically increasing order with regard to said number of hops.

28. The method of claim 26, wherein said preceding column corresponds to a number of hops that is one hop less than a number of hops corresponding to said remaining column.

29. The method of claim 27, further comprising:
selecting a destination node from said plurality of nodes, said destination node being a one of said plurality of nodes other than said root node; and
determining a minimum number of hops between said root node and said destination node by
   counting a number of columns from said first column to a first non-maximum-cost column, inclusive, said first non-maximum-cost column being a first one of said second number of columns for which a cost entry in a one of said first number of rows corresponding to said destination node is not said maximum cost value.

30. The method of claim 27, further comprising:
selecting a destination node from said plurality of nodes, said destination node being a one of said plurality of nodes other than said root node;
storing a destination node identifier in said path storage area, said destination node identifier representing said destination node;
setting a current node identifier to said destination node identifier; and
for each intermediate column, proceeding from a first non-maximum-cost column to
   said first column, wherein said intermediate column is a one of said second number of columns between said first column and said first non-maximum-cost column, inclusive, and said first non-maximum-cost column is a first one of said second number of columns, when proceeding from said first column to said first non-maximum-cost column, for which a cost entry in a row corresponding to said destination node is not said maximum cost value, storing, in said path storage area, a previous node identifier stored in a previous node entry of a row of said intermediate column, wherein said row of said intermediate column corresponds to a one of said plurality of nodes represented by said current node identifier, and setting a current node identifier to said previous node identifier.

31. The method of claim 27, further comprising:

selecting a destination node from said plurality of nodes, said destination node being a one of said plurality of nodes other than said root node;

storing a destination node identifier in said path storage area, said destination node identifier representing said destination node;

setting a current node identifier to said destination node identifier;

searching a one of said first number of rows corresponding to said destination node for a minimum path-cost column, wherein said minimum path-cost column is a one of said second number of columns having a smallest cost entry of said second number of columns in said one of said first number of rows; and for each intermediate column, proceeding from said minimum path-cost column to said first column, wherein said intermediate column is a one of said second number of columns between said first column and said minimum path-cost column, inclusive, storing, in said path storage area, a previous node identifier stored in a previous node entry of a row of said intermediate column, wherein said row of said intermediate column corresponds to a one of said plurality of nodes represented by said current node identifier, and setting a current node identifier to said previous node identifier.

32. The method of claim 10, wherein said link cost is a physical length of a corresponding one of said each one of said at least one neighboring links.

33. The method of claim 10, wherein said link cost is a bandwidth a corresponding one of said each one of said at least one neighboring links is configured to carry.

34. The method of claim 10, wherein:

said storing said node identifier representing said current node in said previous node entry of said row of said remaining column further comprises:

storing a node identifier stored in a next node entry of said row of said preceding column in a next node entry of said row of said remaining column; and said method further comprises:

for each row in said first column, if said corresponding node is a neighbor of said root node, storing a node identifier representing said corresponding node in a first next node entry, wherein said first next node entry is a next node entry of said row in said first column, and else, storing a null value in said first next node entry.

35. A method of finding a path in a network comprising:

creating a path vector, wherein:

said path vector comprises a first number of rows, said network comprises a plurality of nodes and a plurality of links, each one of said plurality of nodes is coupled to at least one other of said plurality of nodes by at least one of said plurality of links, and said path begins at a root node of said plurality of nodes;

for a first hop of a maximum number of hops, processing each row in said first number of rows for said first hop, a selected node of said plurality of nodes corresponding to said row wherein said processing each row in said first number of rows for said first hop comprises:

for said first hop of said maximum number of hops, for each row in said first number of rows, a selected node of said plurality of nodes corresponding to said row, if said selected node is a neighbor of said root node, storing a first link cost in a first cost entry, wherein said first link cost is a link cost of a first one of said plurality of links, said first one of said plurality of links is between said root node and said selected node, and said first cost entry is a cost entry of said row, and storing a node identifier representing said selected node in a storage area, else storing a maximum cost value in said first cost entry, and for each remaining hop of said maximum number of hops, processing said each row in said first number of rows for said each remaining hop.

36. The method of claim 35, wherein said processing said each row in said first number of rows for said each remaining hop comprises:

for said each remaining hop of said maximum number of hops, if said storage area is not empty, for each stored node identifier, said stored node identifier being stored in said storage area and representing a current node of said plurality of nodes, removing said stored node identifier from said storage area, for each neighboring node, said neighboring node being a neighbor of said current node, adding a neighboring link cost to a preceding path cost in order to yield an alternate path cost, wherein said neighboring link cost is a link cost of a second one of said plurality of links, said second one of said plurality of links being between said current node and said neighboring node, and said preceding path cost is a cost value stored in a cost entry of a row of said first number of rows corresponding to said current node, if said alternate path cost is less than a cost value stored in a current cost entry, storing said alternate path cost in said current cost entry, said current cost entry being a cost entry of a row of said first number of rows corresponding to said neighboring node,
storing a node identifier representing said current node in a previous node entry of said row of said first number of rows corresponding to said neighboring node, and
storing a node identifier representing said neighboring node in said storage area.

37. The method of claim 36, wherein said first number is equal to a number of nodes in said plurality of nodes.

38. The method of claim 36, wherein said first maximum number of hops is a maximum number of hops possible in said network.

39. The method of claim 36, wherein said maximum number of hops is a maximum number of hops selected by a user.

40. The method of claim 38, wherein said each neighboring node is a one of said plurality of nodes that is a neighbor of said current node.

41. The method of claim 36, wherein said stored node identifier is already stored in said path storage area at a time when processing of said remaining column is begun.

42. The method of claim 36, wherein said preceding path cost is a cost of a path between said root node and said current node.

43. The method of claim 38, wherein said storage area is a queue.

44. A computer system comprising:
a processor coupled to a network, wherein said network comprises a plurality of nodes and a plurality of links and each one of said plurality of nodes is coupled to at least one other of said plurality of nodes by at least one of said plurality of links;
computer readable medium coupled to said processor; and
computer code, encoded in said computer readable medium, configured to cause said processor to find a path in said network by virtue of being configured to cause said processor to:
generate at least one path cost data set, said path cost data set representing a path cost between a root node of said nodes and destination node of said nodes, wherein said path begins at said root node and ends at said destination node; and
access said at least one path cost data set wherein
said generating and said accessing are performed in such a manner that a minimum-hop path and a minimum-cost path can be determined from said at least one path cost data set,
said minimum-hop path represents a path between said root node and said destination node having a minimum number of hops, and
said minimum-cost path represents a path between said root node and said destination node having a minimum cost and at least a requested bandwidth and
said minimum cost comprises a cost of a bandwidth along at least a portion of said path.

45. The computer system of claim 44, wherein said computer code is further configured to cause said processor to:
store said at least one path cost data set in a path storage area such that said at least one path cost data set can be accessed to determine said minimum-hop path and said minimum-cost path.

46. The computer system of claim 45, wherein said computer code is further configured to cause said processor to:
allocate said path storage area in a data structure that facilitates said access to determine said minimum-hop path and said minimum-cost path.

47. The computer system of claim 44, wherein said computer code is further configured to cause said processor to:
store said at least one path cost data set in a data structure, wherein
said data structure is a two-dimensional array of entries arranged in a plurality of rows and a plurality of columns,
each one of said rows in said data structure corresponds to one of said plurality of nodes, and
each one of said columns in said data structure corresponds to a given hop count.

48. The computer system of claim 47, wherein said computer code is further configured to cause said processor to:
determine said minimum-hop path to said destination node by virtue of being configured to cause said processor:
traverse a one of said rows corresponding to said destination node from a first column of said columns to a second column of said columns, and
store path information representing said minimum-hop path while traversing said data structure from said second column to said first column, said second column being a first one of said columns encountered when traversing said one of said rows from said first column to said second column having non-default cost entry.

49. The computer system of claim 48, wherein said first column corresponds to said root node.

50. The computer system of claim 47, wherein said computer code is further configured to cause said processor to:
determine said minimum-cost path to said destination node by virtue of being configured to cause said processor:
identify a minimum-cost column of said columns, said minimum-cost column having a lowest cost entry of all of said columns in a one of said rows corresponding to said destination node, and
store path information representing said minimum-cost path while traversing said data structure from said minimum-cost column to a first column of said columns.

51. The computer system of claim 50, wherein said first column corresponds to said root node.

52. A computer program product for finding a path in said network, wherein said network comprises a plurality of nodes and a plurality of links and each one of said plurality of nodes is coupled to at least one other of said plurality of nodes by at least one of said plurality of links and said computer program product is encoded in computer readable media and comprising:
a first set of instructions, executable on a computer system, configured to generate at least one path cost data set, said path cost data set representing a path cost between a root node of said nodes and destination node of said nodes, wherein said path begins at said root node and ends at said destination node; and
a second set of instructions, executable on said computer system, configured to access
said at least one path cost data set wherein said generation and said access are performed in such a manner that a minimum-hop path and a minimum-cost path can be determined from said at least one path cost data set, said minimum-hop path represents a path between said root node and said destination node having a minimum number of hops and at least a requested bandwidth, said minimum-cost path represents a path between said root node and said destination node having a minimum cost, and at least a requested bandwidth, and said minimum cost comprises a cost of a bandwidth along at least a portion of said path.

53. The computer program product of claim 52, further comprising:

a third set of instructions, executable on said computer system, configured to store said at least one path cost data set in a path storage area such that said at least one path cost data set can be accessed to determine said minimum-hop path and said minimum-cost path.

54. The computer program product of claim 53, further comprising:

a fourth set of instructions, executable on said computer system, configured to allocate said path storage area in a data structure that facilitates said access to determine said minimum-hop path and said minimum-cost path.

55. The computer program product of claim 52, further comprising:

a third set of instructions, executable on said computer system, configured to store said at least one path cost data set in a data structure, wherein said data structure is a two-dimensional array of entries arranged in a plurality of rows and a plurality of columns, each one of said rows in said data structure corresponds to one of said plurality of nodes, and each one of said columns in said data structure corresponds to a given hop count.

56. The computer program product of claim 55, further comprising:

a fourth set of instructions, executable on said computer system, configured to determine said minimum-hop path to said destination node, said fourth set of instructions comprising:

a first subset of instructions, executable on said computer system, configured to traverse a one of said rows corresponding to said destination node from a first column of said columns to a second column of said columns, and a second subset of instructions, executable on said computer system, configured to store path information representing said minimum-hop path while traversing said data structure from said second column to said first column, said second column being a first one of said columns encountered when traversing said one of said rows from said first column to said second column having non-default cost entry.

57. The computer program product of claim 56, wherein said first column corresponds to said root node.

58. The computer program product of claim 55, further comprising:

a fourth set of instructions, executable on said computer system, configured to determine said minimum-cost path to said destination node, said fourth set of instructions comprising:

a first subset of instructions, executable on said computer system, configured to identify a minimum-cost column of said columns, said minimum-cost column having a lowest cost entry of all of said columns in a one of said rows corresponding to said destination node, and a second subset of instructions, executable on said computer system, configured to store path information representing said minimum-cost path while traversing said data structure from said minimum-cost column to a first column of said columns.

59. The computer program product of claim 58, wherein said first column corresponds to said root node.

60. A method comprising:

generating at least one path cost data set, wherein, said path cost data set stores a path cost of a path between a root node and destination node, said path is in a network, said network comprises a plurality of nodes and a plurality of links, each one of said plurality of nodes is coupled to at least one other of said plurality of nodes by at least one of said plurality of links, and said nodes comprise said root node and said destination node;

storing said at least one path cost data set in a data structure, wherein a first attribute of said data structure represents a hop count of said path, and a second attribute of said data structure represents each node of said path; and accessing said at least one path cost data set, wherein, said generating and said accessing are performed in such a manner that a minimum-hop path and a minimum-cost path can be determined from said at least one path cost data set, said minimum-hop path represents a path between said root node and said destination node having a minimum number of hops, and at least a requested bandwidth, and said minimum-cost path represents a path between said root node and said destination node having a minimum cost and at least a requested bandwidth, and said minimum cost comprises a cost of a bandwidth along at least a portion of said path.

61. The method of claim 60, wherein said storing comprises:

storing said at least one path cost data set in a path storage area such that said at least one path cost data set can be accessed to determine said minimum-hop path and said minimum-cost path.

62. The method of claim 61, further comprising:

allocating said path storage area in said data structure, wherein said data structure facilitates said access to determine said minimum-hop path and said minimum-cost path.

63. The method of claim 60, wherein:

said data structure is a two-dimensional array of entries arranged in a plurality of rows and a plurality of columns, each one of said rows in said data structure corresponds to one of said plurality of nodes, and each one of said columns in said data structure corresponds to a given hop count.

64. The method of claim 63, farther comprising:

determining said minimum-hop path to said destination node by:

traversing a one of said rows corresponding to said destination node from a first column of said columns to a second column of said columns, and storing path information representing said minimum-hop path while traversing said data structure from said second column to said first column, said second column being a first one of said columns encountered when traversing said one of said rows from said first column to said second column having non-default cost entry.

65. The method of claim 64, wherein said first column corresponds to said root node.

66. The method of claim 63, further comprising:
determining said minimum-cost path to said destination node by:
identifying a minimum-cost column of said columns, said minimum-cost column having a lowest cost entry of all of said columns in a one of said rows corresponding to said destination node, and
storing path information representing said minimum-cost path while traversing said data structure from said minimum-cost column to a first column of said columns.

67. The method of claim 66, wherein said first column corresponds to said root node.

* * * * *